United States Patent
Dall'Anese et al.

(10) Patent No.: US 10,148,092 B2
(45) Date of Patent: Dec. 4, 2018

(54) REAL TIME VOLTAGE REGULATION THROUGH GATHER AND BROADCAST TECHNIQUES

(71) Applicants: Alliance for Sustainable Energy, LLC, Golden, CO (US); Delft University of Technology, Delft (NL); Regents of the University of Minnesota, Minneapolis, MN (US)

(72) Inventors: Emiliano Dall'Anese, Arvada, CO (US); Andrea Simonetto, Louvain-la-Neuve (BE); Sairaj Dhople, Minneapolis, MN (US)

(73) Assignees: ALLIANCE FOR SUSTAINABLE ENERGY, LLC, Golden, CO (US); REGENTS OF THE UNIVERSITY OF MINNESOTA, Minneapolis, MN (US); TECHNISCHE UNIVERSITEIT DELFT, Delft (NL)

( * ) Notice: Subject to any disclaimer, the term of this patent is extended or adjusted under 35 U.S.C. 154(b) by 0 days.

(21) Appl. No.: 15/418,272

(22) Filed: Jan. 27, 2017

(65) Prior Publication Data

US 2017/0214244 A1      Jul. 27, 2017

Related U.S. Application Data

(60) Provisional application No. 62/287,800, filed on Jan. 27, 2016, provisional application No. 62/348,208, filed on Jun. 10, 2016.

(51) Int. Cl.
G06F 19/00        (2018.01)
H02J 3/38         (2006.01)
(Continued)

(52) U.S. Cl.
CPC ............... H02J 3/382 (2013.01); H02J 3/06 (2013.01); H02J 3/16 (2013.01); H02J 3/383 (2013.01);
(Continued)

(58) Field of Classification Search
CPC combination set(s) only.
See application file for complete search history.

(56) References Cited

U.S. PATENT DOCUMENTS 8,446,040 B2 *   5/2013   Paik .................... H02J 3/14
                                                   307/39
2004/0051387 A1   3/2004   Lasseter et al.
(Continued)

FOREIGN PATENT DOCUMENTS

WO   WO 2016/004433 A1   1/2016
WO   WO 2016/176775 A1   11/2016

OTHER PUBLICATIONS

Bank et al., "Development of a High Resolution, Real Time, Distribution-Level Metering System and Associated Visualization, Modeling, and Data Analysis Functions", NREL Technical Report NREL/TP-5500-56610, May 2013, pp. 1-36.
(Continued)

*Primary Examiner* — Kidest Bahta
(74) *Attorney, Agent, or Firm* — Robert G. Pittelkow

(57) ABSTRACT

An example device includes a processor configured to receive a plurality of voltage measurements corresponding to nodes in a distribution network, and determine, for each respective node: a value of a first coefficient, based on a previous value of the first coefficient, a minimum voltage value for the node, and a voltage measurement that corresponds to the node, and a value of a second coefficient based on a previous value of the second coefficient, a maximum voltage value for the node, and the voltage measurement.
(Continued)

The processor of the example device is also configured to cause an inverter-interfaced energy resource connected to the distribution network to modify its output power based on the value of the first coefficient for each node and the value of the second coefficient for each node.

20 Claims, 13 Drawing Sheets

(51) Int. Cl.
*H02J 3/06* (2006.01)
*H02J 3/16* (2006.01)
*H02J 13/00* (2006.01)
*H02J 3/32* (2006.01)

(52) U.S. Cl.
CPC .............. *H02J 3/386* (2013.01); *H02J 3/387* (2013.01); *H02J 13/0062* (2013.01); *H02J 3/32* (2013.01); *Y02E 10/563* (2013.01); *Y02E 10/566* (2013.01); *Y02E 10/763* (2013.01); *Y02E 40/34* (2013.01); *Y02E 40/72* (2013.01); *Y02E 60/722* (2013.01); *Y02E 60/726* (2013.01); *Y04S 10/12* (2013.01); *Y04S 10/123* (2013.01); *Y04S 10/14* (2013.01); *Y04S 10/24* (2013.01)

(56) References Cited

U.S. PATENT DOCUMENTS

| | | | |
|---|---|---|---|
| 2006/0276938 A1* | 12/2006 | Miller | G06Q 50/06 700/295 |
| 2008/0077368 A1 | 3/2008 | Nasle | |
| 2009/0319090 A1* | 12/2009 | Dillon | G06Q 10/04 700/291 |
| 2011/0015801 A1* | 1/2011 | Mazzarella | G06Q 30/018 700/297 |
| 2013/0297089 A1* | 11/2013 | Fu | G06F 1/26 700/295 |
| 2014/0062426 A1 | 3/2014 | Yang et al. | |
| 2015/0134280 A1 | 5/2015 | Narayan et al. | |
| 2016/0013652 A1* | 1/2016 | Li | H02J 3/32 307/24 |
| 2016/0087440 A1 | 3/2016 | Matan et al. | |
| 2016/0179077 A1 | 6/2016 | Le Boudec et al. | |
| 2018/0138711 A1 | 5/2018 | Dall'Anese et al. | |

OTHER PUBLICATIONS

Dhople et al., "Linear Approximations to AC Power Flow in Rectangular Coordinates", Fifty-third Annual Allerton Conference, UIUC, Illinois, Sep. 2015, pp. 211-217.

Guggilam et al., "Scalable Optimization Methods for Distribution Networks With High PV Integration", IEEE Transactions on Smart Grid, Jul. 2016, vol. 7, No. 4, pp. 2061-2070.

Koshal et al., "Multiuser Optimization: Distributed Algorithms and Error Analysis", SIAM Journal on Optimization, 2011, vol. 21, No. 3, pp. 1046-1081.

Simonetto et al., "Double Smoothing for Time-Varying Distributed Multiuser Optimization", IEEE Global Conference on Signal and Information Processing (Global SIP), Dec. 2014, pp. 852-856.

Bernstein et al., "A Composable Method for Real-lime Control of Active Distribution Networks with Explicit Power Setpoints. Part I: Framework", Electric Power Systems Research, Aug. 2015, vol. 125, pp. 254-264.

Bernstein et al., "Feedback-Based Real-Time Optimization of Multiphase Distribution Networks", Presentation to École Polytechnique Fédérale de Lausanne (EPFL), Oct. 3, 2017, available at http://icawww1.epfl.ch/PS_files/Talk_EPFL_AB2017.pdf, pp. 1-50.

Bernstein et al., "Real-Time Feedback-Based Optimization of Distribution Grids: A Unified Approach", Nov. 2017, available at https://arxiv.org/pdf/1711.01627.pdf, pp. 1-11.

Bolognani et al., "Distributed Reactive Power Feedback Control for Voltage Regulation and Loss Minimization", IEEE Transactions on Automatic Control, Apr. 2015, vol. 60, No. 4, pp. 966-981.

Christakou et al., "GECN: Primary Voltage Control for Active Distribution Networks via Real-Time Demand-Response", IEEE Transactions on Smart Grid, Mar. 2014, vol. 5, No. 2, pp. 622-631.

Dall'Anese et al., "Optimal Power Flow Pursuit", IEEE Transactions on Smart Grid, Jan. 27, 2016, pp. 1-11.

Dall'Anese, "Online Optimization with Feedback for Virtual Power Plants", Presentation, Golden, CO, Aug. 2, 2017, pp. 1-60.

Dall'Anese et al., "Optimal Regulation of Virtual Power Plants", IEEE Transactions on Power Systems, Aug. 2017, DOI 10.1109/TPWRS.2017.2741920, pp. 1-14.

Hauswirth et al., "Projected Gradient Descent on Riemannian Manifolds with Applications to Online Power System Optimization", 54th Annual Allerton Conference on Communication, Control, and Computing, Sep. 2016, pp. 225-232.

Hauswirth et al., "Online Optimization in Closed Loop on the Power Flow Manifold", 12th IEEE PES PowerTech Conference 2017, pp. 1-6.

Jokić et al., "Real-time Control of Power Systems Using Nodal Prices", International Journal of Electrical Power & Energy Systems, Oct. 2009, vol. 31, No. 9, pp. 522-530.

Kersting, Distribution System Modeling and Analysis, Chapter 6, 2nd ed., Boca Raton, FL, CRC Press, 2007, pp. 145-183.

Reyes-Chamorro et al., "A Composable Method for Real-time Control of Active Distribution Networks with Explicit Power Setpoints. Part II: Implementation and Validation", Electric Power Systems Research, 2015, vol. 125, pp. 265-280.

Tang et al., "Real-Time Optimal Power Flow", IEEE Transactions on Smart Grid, Nov. 2017, vol. 8, No. 6, pp. 2963-2973.

International Search Report and Written Opinion for International (PCT) Application No. PCT/US17/61911, dated Aug. 27, 2018, pp. 1-16.

* cited by examiner

REAL TIME VOLTAGE REGULATION THROUGH GATHER AND BROADCAST TECHNIQUES

CROSS-REFERENCE TO RELATED APPLICATIONS

This application claims the benefit of U.S. Provisional Application No. 62/287,800, titled "DISTRIBUTED FEEDBACK CONTROLLERS FOR OPTIMAL POWER FLOW" and filed Jan. 27, 2016, and U.S. Provisional Application No. 62/348,208, titled "DISTRIBUTED FEEDBACK CONTROLLERS FOR OPTIMAL POWER FLOW" and filed Jun. 10, 2016, the entire content of each of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

As renewable energy becomes more important in today's society, power grids may have to manage increasingly distributed energy resources. Even modest housing may have photovoltaic systems and/or wind turbines installed to reduce dependence on the grid, and to offset energy costs. As prevalence of these distributed energy resources increases, grid managers, such as those who manage power distribution networks, will be faced with new challenges in preventing network overload, redistributing power generated by distributed sources, and providing customers some input regarding the power produced by the customer's energy resource.

SUMMARY

The present disclosure provides systems, devices, and methods relating to operation and control of power distribution networks having high integration of distributed energy resources. The techniques described herein may be used to continuously drive network operation towards AC optimal power flow (OPF) targets.

In one example, a device includes at least one processor configured to: receive a plurality of voltage measurements, wherein voltage measurements in the plurality of voltage measurements correspond to respective nodes in a plurality of nodes of a distribution network and determine, for each respective node in the plurality of nodes: a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node, and a respective value of a second voltage-constraint coefficient based on a respective previous value of the second voltage-constraint coefficient, a respective maximum voltage value for the respective node, and the respective voltage measurement. The at least one processor is further configured to cause at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

In another example, a system includes a plurality of voltage measurement devices, each configured to: determine a respective voltage measurement that corresponds to a respective node in a plurality of nodes of a distribution network, and output the respective voltage measurement. The system also includes a distribution network management system configured to: receive, from each of the plurality of voltage measurement devices, the respective voltage measurement, determine, for each respective node in the plurality of nodes: a respective value of a first voltage-constraint coefficient, based on a respective previous value of the first voltage-constraint coefficient, a respective minimum voltage value for the respective node, and the respective voltage measurement and a respective value of a second voltage-constraint coefficient based on a respective previous value of the second voltage-constraint coefficient, a respective maximum voltage value for the respective node, and the respective voltage measurement, and output the respective value of the first voltage-constraint coefficient for each respective node and the respective value of the second voltage-constraint coefficient for each respective node. The system further includes a plurality of inverter-interfaced energy resource management devices corresponding to a plurality of inverter-interfaced energy resources that are connected to the distribution network, each inverter-interfaced energy resource management device being configured to: receive the respective value of the first voltage-constraint coefficient for each respective node and the respective value of the second voltage-constraint coefficient for each respective node, determine, based on the respective value of the first voltage-constraint coefficient for each respective node and the respective value of the second voltage-constraint coefficient for each respective node, a respective power setpoint value, and modify a respective output power of a respective inverter-interfaced energy resource from the plurality of inverter-interfaced energy resources, based on the respective power setpoint value.

In another example, a method includes receiving, by a distribution network management system including at least one processor, a plurality of voltage measurements. Voltage measurements in the plurality of voltage measurements correspond to respective nodes in a plurality of nodes of a distribution network. The method also includes determining, by the distribution network management system, for each respective node in the plurality of nodes: a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node, and a respective value of a second voltage-constraint coefficient based on a respective previous value of the second voltage-constraint coefficient, a respective maximum voltage value for the respective node, and the respective voltage measurement. The method further includes causing at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

DETAILED DESCRIPTION

The present disclosure provides systems, devices, and methods for real-time (or near-real-time) voltage regulation of energy resources in a power distribution network via gather and broadcast techniques. The techniques described herein may be employed in the domain of operation and control of power distribution network systems having high integration of distributed energy resources (DERs). As one example, the devices of a power distribution network system may leverage the fast feedback abilities offered by power-electronics-interfaced DERs, such as renewable energy sources, to continuously drive the system operation towards AC optimal power flow (OPF) targets.

Related art works focused on addressing power-quality and reliability concerns related to power-electronics-interfaced DERs operating with business-as-usual practices have looked at the design of Volt/VAr, Volt/Watt, and droop-based control strategies to regulate output powers based on local measurements, so that terminal voltages are within acceptable levels. These strategies, however, may not guarantee system-level optimality, and the stability of a system employing such strategies is questionable. On a different time scale, centralized and distributed OPF-type algorithms have been developed for power distribution systems to compute optimal steady-state inverter setpoints.

Objectives of the OPF task at the distribution level include minimization of power losses and maximization of economic benefits to utilities and end-users. Typical constraints in the OPF task ensure that voltage magnitudes and currents are within predetermined bounds, and DER setpoints are within given operational and hardware limits. It is well-known that the OPF is nonconvex and NP-hard. Related art centralized approaches may utilize off-the-shelf solvers for nonlinear programs, or may leverage convex relaxation and approximation techniques to obtain convex surrogates. On the other hand, related art distributed solution approaches may leverage the decomposability of the Lagrangian associated with convex reformulations/approximations of the OPF, and utilize iterative primal-dual-type methods to decompose the solution of the OPF task across devices. OPF approaches may be applied to optimize the operation of power transmission networks, but the time required to collect all the problem inputs (e.g., loads across the network and available power-electronics-interfaced DER powers) and solve the OPF task may not be consistent with underlying distribution-systems dynamics.

Figure 1:
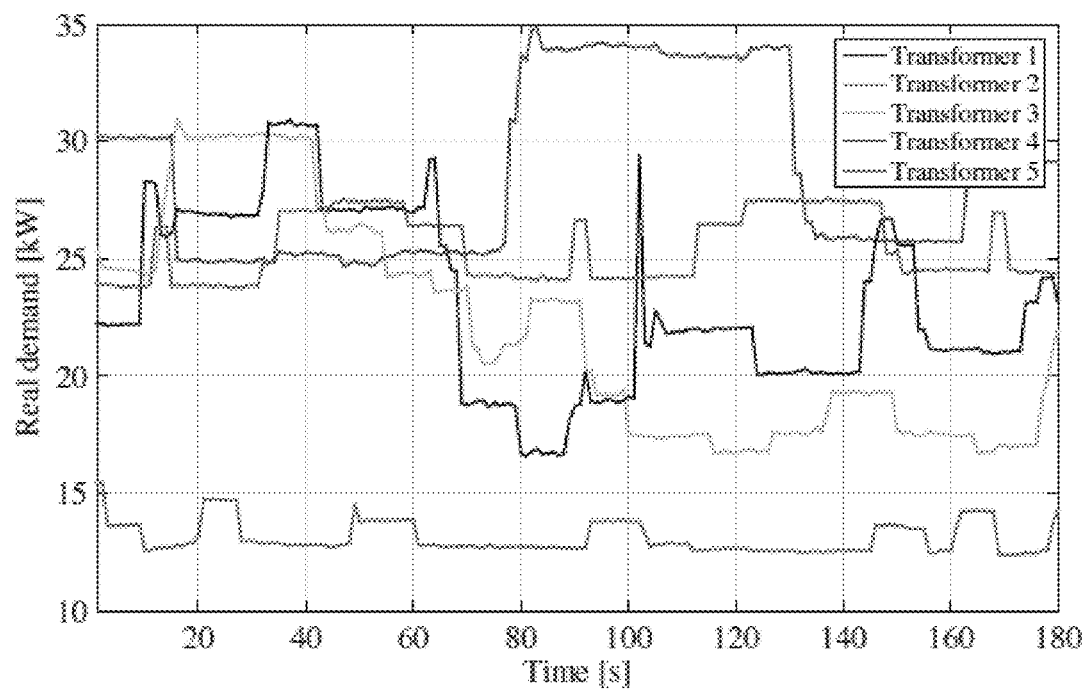
FIG. 1 is a graphical plot illustrating loading of five secondary transformers in a power distribution network located in the neighborhood of Anatolia, near Sacramento, Calif.

FIG. 1 is a graphical plot illustrating loading of five secondary transformers in a power distribution network (also referred to herein as a "feeder") located in the neighborhood of Anatolia, near Sacramento, Calif. In FIG. 1, trajectories correspond to transformer loadings from 5:00 PM to 5:03 PM on a day in August of 2010. It is apparent in FIG. 1 that the inverter setpoints should be updated every second in order to cope with load variations while guaranteeing system-level optimality. However, related art distribution management systems (DMS) are unable to solve the OPF task and dispatch setpoints in such a fast time scale. On the other hand, distributed OPF approaches, where the power commands are updated at a slow time scale dictated by the convergence time of the distributed algorithm, may systematically regulate the inverter power-outputs around outdated setpoints, possibly leading to violations of voltage and security limits.

The systems and devices of the present disclosure bypass traditional hierarchical setups, where local feedback control and network optimization operate at distinct time scales, by employing distributed control techniques that leverage the opportunity for fast feedback offered by power-electronics-interfaced DERs and continuously drive the inverter output powers towards OPF-based targets. These targets capture well-defined performance objectives as well as voltage regulation constraints. The design of the control techniques described herein further develops linear approximations of the AC power-flow equations as described in S. Guggilam et al., *Scalable optimization methods for distribution networks with high PV integration*, IEEE Transactions on Smart Grid, 2015, submitted (hereinafter "Guggilam") as well as the double-smoothing technique described in J. Koshal et al., *Multiuser optimization: Distributed algorithms and error analysis*, SIAM J. on Optimization, vol. 21, no. 3, pp.

1046-1081, 2011 (hereinafter "Koshal") for time-invariant optimization and extended to the time-varying setup in A. Simonetto et al., *Double smoothing for time-varying distributed multiuser optimization*, IEEE Global Conf. on Signal and Information Processing, December 2014 (hereinafter "Simonetto"). The relevant content of each of Guggilam, Koshal, and Simonetto is incorporated herein by reference. By virtue of this technical approach, the systems, devices, and methods described herein may include elementary operations implementable, for instance, on low-cost microcontrollers that accompany power-electronics interfaces of gateways and DERs. Further, while pursuing OPF solutions, the techniques described herein may not require knowledge of loads at all the distribution transformers and points of interconnection of the power distribution network. The present disclosure also analytically establishes the convergence and OPF-target tracking capabilities of the described techniques.

The techniques described herein may considerably broaden related art approaches by focusing on AC OPF setups for power distribution network systems with arbitrary topologies, by using a new real-time online algorithm with embedded voltage measurements, and by establishing convergence and optimality in the case of time-varying loads and ambient conditions. The techniques of the present disclosure offer significant contribution over the state of the art by establishing convergence results for the case of time-varying loads and ambient conditions and enabling low complexity implementations.

Figure 2:
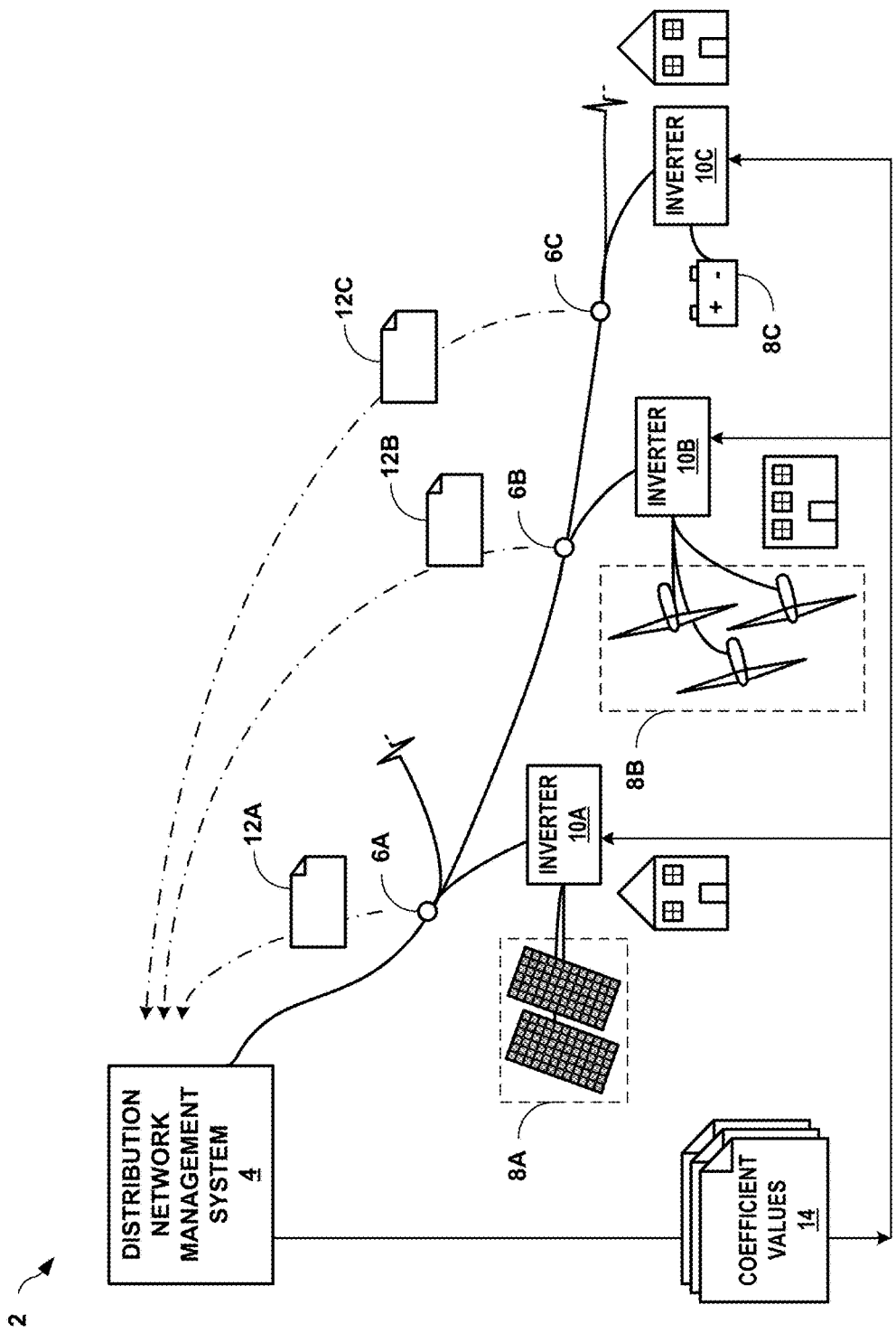
FIG. 2 is a conceptual diagram illustrating an example power distribution network system configured to regulate voltage through gather and broadcast techniques, in accordance with one or more aspects of the present disclosure.

FIG. 2 is a conceptual diagram illustrating an example power distribution network system (e.g., system 2) configured to regulate voltage through gather and broadcast techniques, in accordance with one or more aspects of the present disclosure. In the example of FIG. 2, system 2 includes distribution network management system 4 and nodes 6A-6C (collectively "nodes 6"). System 2 also includes energy resources 8A-8C (collectively "energy resources 8") and inverters 10A, 10B, and 10C (collectively "inverters 10"). Distribution network management system 4, nodes 6, and inverters 10 may be interconnected through one or more distribution lines, as illustrated in FIG. 2.

System 2 represents a simplified power distribution network system, and may, in some examples, include any number of additional ones of nodes 6 and/or energy resources 8. That is, while shown as having three nodes and three energy resources connected to three respective inverters, system 2 may include more or fewer nodes and/or energy resources in other examples. Additionally, FIG. 2 illustrates only one example of a power distribution network system configured to perform the techniques described herein, and various other systems may be used in accordance with the present disclosure.

In the example of FIG. 2, nodes 6 are devices configured to measure a voltage value at a location of the distribution network and output the voltage measurement. Nodes 6 may be located at any point in the distribution network. In some examples, one or more of nodes 6 may be in the middle of a transmission line. In some examples, one or more of nodes 6 may be at a junction of two or more transmission lines. Examples of nodes 6 include phasor measurement units, inverters, power substations, and other systems or devices capable of determining the voltage of a location in the distribution network.

Components of system 2 (e.g., nodes 6, distribution network management system 4, and/or inverters 10) may be configured to perform the methods described herein in an iterative fashion that allows system 2 to seek OPF targets in real-time or near-real-time. That is, the techniques described herein may be performed on a relatively fast time scale, thereby allowing more efficient operation while ensuring that physical constraints (e.g., line maximums, device safety standards, etc.) are maintained. For instance, the components of system 2 may perform operations every second, every millisecond, or at some other interval. In some examples, different components may perform operations at different intervals while in other examples, all components of system 2 may generally perform the operations described herein with the same frequency.

In the example of FIG. 2, nodes 6 are configured to determine respective voltage measurements 12A-12C (collectively "voltage measurements 12") on an iterative basis. Each voltage measurement may represent the present voltage at a particular location in the distribution network. In accordance with the techniques described herein, nodes 6 may output voltage measurements 12. In the example of FIG. 2, for instance, nodes 6 may transmit voltage measurements 12 to distribution network management system 4 using wireless and/or wired communication. In other examples, nodes 6 may additionally or alternatively transmit voltage measurements 12 to one or more other components of system 2, such as one or more of inverters 10.

In the example of FIG. 2, distribution network management system 4 represents a system configured to manage a power distribution network to provide power to customers. For example, the power distribution network shown in FIG. 2 may be connected to a power transmission network (not shown). Distribution network management system 4 may manage the receipt and distribution of power from the transmission network while avoiding overloading the distribution network and ensuring that customers' power needs are met.

In some examples, distribution network management system 4 may represent a system owned and operated by a utility company. In other examples, distribution network management system 4 may be owned and/or operated by another entity. For instance, distribution network management system 4 may represent an access point of a power network of a business park or corporate campus. As another example, distribution network management system 4 may manage a micro-grid, such as may be employed on a military base, mobile hospital, or other small area in which electrical power may be desirable. In other words, distribution network management system 4 may represent any system configured to manage power distribution via a distribution network.

Distribution network management system 4 may be a computing device, such as a server computer, a desktop computer, or any other device capable of implementing some or all of the control techniques described herein. In some examples, distribution network management system 4 may represent a cloud computing environment. That is, while shown as a single box in the example of FIG. 2, distribution network management system 4 may, in other examples, be a group of distributed computing resources that communicate with one another.

Distribution network management system 4 may receive voltage measurements 12 and iteratively determine a set of voltage-constraint coefficient values ("coefficient values 14"). These coefficients are related to the extent of violation of defined voltage limits and are determined as further described herein. Distribution network management system 4 may determine two voltage-constraint coefficients for each of nodes 6 in the distribution network. Thus, in the simplified example of FIG. 2, coefficient values 14 may include six values.

For each of nodes 6, distribution network management system 4 may determine a first voltage-constraint coefficient value based on a previous value of the first voltage-constraint coefficient for the node, a minimum voltage value for the node, and the voltage measurement for the node. Thus, for node 6A, distribution network management system 4 may determine a first voltage-constraint coefficient value based on the previous first voltage-constraint coefficient value for node 6A, a minimum voltage value for node 6A, and voltage measurement 12A. Similarly, for each of nodes 6, distribution network management system 4 may determine a second voltage-constraint coefficient value based on a previous value of the first voltage-constraint coefficient, a maximum voltage value for the node, and the voltage measurement for the node. In some examples, the first and second voltage-constraint coefficient values for each node may be determined additionally or alternatively based on other criteria. Determination of values for the first and second voltage-constraint coefficients is further described with respect to FIGS. 5-13 below. Distribution network management system 4, in the example of FIG. 2, may output coefficient values 14 to each of inverters 10.

Inverters 10, in the example of FIG. 2, represent power electronics configured to manage the power output of a respective energy resource. For instance, inverter 10A may receive power from energy resource 8A and transform the power into a form that can be transmitted via the connected distribution network. Power inverters, in general, may perform various operations to make the power output of energy resources more stable and/or more compatible with power networks.

In the example of FIG. 2, each of inverters 10 may receive coefficient values 14. Inverters 10 may use coefficient values 14 to determine one or more power setpoint values that dictate the levels of real and/or reactive power that are to be outputted by the associated energy resource. For example, inverter 10A would determine setpoint values for energy resource 8A, inverter 10B would determine setpoint values for energy resource 8B, and so on. Each of inverters 10 may determine setpoint values based on the coefficient values 14 and previous setpoint values for the inverter. Determination of setpoint values are further described with respect to FIGS. 5-13 below. Inverters 10 may use the determined setpoint values to manage the power outputs of energy resources 8.

Energy resources 8 may, in various examples, represent any device or system capable of generating electrical power that can be fed into a distribution network. In the example of FIG. 2, for instance, energy resource 8A is a PV system, energy resource 8B is a system of small wind turbines, and energy resource 8C is a battery or energy storage system. Other examples of energy resources include generators (e.g., gas generators, etc.), fuel cells, electric vehicles, and others.

While certain operations are described in the example of FIG. 2 as being performed by distribution network management system 4 or inverters 10, these operations may, in other examples, be performed by one or more other components of system 2, or by components not shown in FIG. 2. In some examples, for instance, each of inverters 10 may be configured to receive voltage measurements 12 and determine coefficient values 14. As another example, distribution network management system 4 may, in some instances, be configured to determine setpoint values for each of inverters 10. In yet another example, one or both of these operations may be performed by one or more standalone computing devices (not shown) that communicate with inverters 10. This may be the case when, for example, one or more of inverters 10 are legacy devices that do not have sufficient computing power or communications abilities.

In some examples, one or more of inverters 10 may not receive coefficient values 14 in one or more iterations. This may be the case when, for instance, the communication network between distribution network management system 4 and one or more of inverters 10 is congested, inoperable, or otherwise constrained. In some such examples, if one of inverters 10 does not receive coefficient values 14, the inverter may generally rely on a previously received iteration of coefficient values 14 in conjunction with updated coefficient values for its node location. That is, if the inverter is able to measure the voltage at its location, the inverter may determine a first voltage-constraint coefficient value and second voltage-constraint coefficient value for its location, and update only these values in the previous iteration of coefficient values 14. Then the inverter may determine its setpoint values as previously described, but using the modified previous iteration of coefficient values 14.

By iteratively determining power setpoints, performance of power distribution system 2 may be closer to the OPF solution for the network without requiring complex or computationally powerful components. Additionally, by incorporating voltage measurements, the techniques described herein ensure that voltage limits are not violated. Furthermore, the distributed nature of the techniques performed by system 2 may allow for more flexibility should there be communications constraints, as further described herein. In addition, the techniques implemented in system 2 may seek OPF targets while taking into account the objectives of both utility operators and customers.

The mathematical development of the control techniques described herein is detailed below. Upper-case (lower-case) boldface letters will be used for matrices (column vectors); $(\cdot)^T$ for transposition; $(\cdot)^*$ complex-conjugate; and, $(\cdot)^H$ complex-conjugate transposition; $\Re\{\cdot\}$ and $\Im\{\cdot\}$ denote the real and imaginary parts of a complex number, respectively; $j:=\sqrt{-1}$ the imaginary unit; and $|\cdot|$ denotes the absolute value of a number or the cardinality of a set. For $x \in \mathbb{R}$, function $[x]_+$ is defined as $[x]_+:=\max\{0, x\}$. Further, $\mathbb{1}_A(x)$ denotes the indicator function over the set $A \subset \mathbb{R}$; that is $\mathbb{1}_A(x)=1$ if $x \in A$ and $\mathbb{1}_A(x)=0$ otherwise. For a given N×1 vector $x \in \mathbb{R}^N$, $\|x\|_2:=\sqrt{v^H v}$; $\|x\|_1:=\Sigma_i |[x]_i|$; and, diag(x) returns a N×N matrix with the elements of v in its diagonal. Given a given matrix $X \in \mathbb{R}^{N \times M}$, $x_{m,n}$ denotes its (m, n)-th entry. $\nabla_x f(x)$ returns the gradient vector of $f(x)$ with respect to $x \in \mathbb{R}^N$. Finally, $\mathbb{1}_N$ denotes the N×1 vector with all ones.

Consider a power distribution network comprising N+1 nodes collected in the set $\mathcal{N} \cup \{0\}$, $\mathcal{N}:=\{1, \ldots, N\}$, and distribution lines represented by the set of edges $\mathcal{E}:=\{(m, n)\} \subset (\mathcal{N} \cup \{0\}) \times (\mathcal{N} \cup \{0\})$. Assume that the temporal domain is discretized as $t=k\tau$, where $k \in \mathbb{N}$ and $\tau > 0$ is a given interval, chosen to capture the variations on loads and ambient conditions (cf. FIG. 1). Let $V_n^k \in \mathbb{C}$ and $I_n^k \in \mathbb{C}$ denote the phasors for the line-to-ground voltage and the current injected at node n over the kth timeslot, respectively, and define the N-dimensional complex vectors $v^k:=[V_1^k, \ldots, V_N^k]^T \in \mathbb{C}^N$ and $i^k:=[I_1^k, \ldots, I_N^k]^T \in \mathbb{C}^N$. Node 0 denotes the secondary of the distribution transformer, and it is taken to be the slack bus. Using Ohm's and Kirchhoff's circuit laws, the following linear relationship can be established:

$$\begin{bmatrix} I_0^k \\ I^k \end{bmatrix} = \underbrace{\begin{bmatrix} y_{00}^k & (\overline{y}^k)^T \\ \overline{y}^k & Y^k \end{bmatrix}}_{:=Y_{net}^k} \begin{bmatrix} V_0^k \\ V^k \end{bmatrix}, \quad (1)$$

where the system admittance matrix $Y_{net}^k \in \mathbb{C}^{(N+1) \times (N+1)}$ is formed based on the network topology and the $\pi$-equivalent circuit of the distribution lines, and is partitioned in sub-matrices with the following dimensions: $Y^k \in \mathbb{C}^{N \times N}$, $\overline{y}^k \in \mathbb{C}^{N \times 1}$, and $y_{00}^k \in \mathbb{C}$. More detailed teachings on distribution line modeling may be found in chapter 6 of W. H. Kersting, *Distribution System Modeling and Analysis*. 2nd ed., Boca Raton, Fla.: CRC Press, 2007 (hereinafter "Kersting"), which is incorporated herein by reference. Finally, $V_0^k = \rho_0 e^{j\theta_0}$ is the slack-bus voltage with $\rho_0$ denoting the voltage magnitude at the secondary of the transformer. A constant-power load model is utilized, and $P_{l,n}^k$ and $Q_{l,n}^k$ denote the real and reactive demands at node $n \in \mathcal{N}$ at time k.

Power-electronics-interfaced DERs, such as photovoltaic (PV) systems, wind turbines, battery systems, or other energy resources are assumed to be located at nodes $\mathcal{G} \subseteq \mathcal{N}$. For future developments, define $N_\mathcal{G} := |\mathcal{G}|$. Given prevailing ambient conditions, let $P_{aV,n}^k$ denote the maximum real power generation at node $n \in \mathcal{G}$ at time k—hereafter referred to as the available real power. For example, for a PV system, the available real power is a function of the incident irradiance, and corresponds to the maximum power point of the PV array. When DERs operate at unity power factor and inject, into the network, the whole available real power, a set of challenges related to power quality and reliability in distribution network systems may emerge for sufficiently high levels of deployed DER capacity. For instance, over-voltages may be experienced during periods when DER generation exceeds the demand, while fast-variations in the output of the DERs tend to propagate transients that lead to wear-out of legacy switchgear. Efforts to ensure reliable operation of existing distribution network systems with increased DER generation are generally focused on the possibility of inverters providing reactive power compensation and/or curtailing real power. Let $P_n^k$ and $Q_n^k$ denote the real and reactive powers at the AC side of inverter $n \in \mathcal{G}$ at time k. The set of possible inverter operating points for PV systems can be specified as:

$$(P_n^k, Q_n^k) \in \mathcal{Y}_n^k := \{(P_n, Q_n): 0 \leq P_n \leq P_{aV,n}^k, (Q_n)^2 \leq S_n^2 - (P_n)^2\} \quad (2)$$

where $S_n$ is the rated apparent power. Lastly, the additional constraint $|Q_n| \leq (\tan \theta) P_n$ can be considered in the definition of $\mathcal{Y}_n^k$ to enforce a minimum power factor of $\cos \theta$. Parameter $\theta$ can be conveniently tuned to account for a variety of control strategies, including reactive power compensation, real power curtailment, and joint real and reactive control. Other examples of DERs that may exist on a power distribution network include small-scale diesel generators, fuel cells, and others. All such DERs can be accommodated in the framework described herein by properly capturing their physical limits in the set $\mathcal{Y}_n^k$.

The techniques described herein may allow DER control that regulates the output powers $\{P_i^k, Q_i^k\}_{i \in \mathcal{G}}$ at a time scale compatible with distribution network system dynamics, and that operates in a closed-loop fashion as:

$$[P_i^k, Q_i^k] = \mathcal{C}_i(P_i^{k-1}, Q_i^{k-1}, y^k), \forall i \in \mathcal{G} \quad (3a)$$

$$\dot{y}(t) = \mathcal{F}(y, \{P_i^k, Q_i^k\}) \quad (3b)$$

$$y^k = \mathcal{S}(y(t)), \quad (3c)$$

where $\mathcal{F}(\cdot)$ models the physics of the distribution network systems (e.g., power flows) as well as the dynamics of primary-level inverter control devices, y(t) represents pertinent electrical quantities (e.g., voltages and power flows), and $y^k$ is a measurement of (some entries of) y(t) at time $k\tau$. In the following, the control function $\mathcal{C}_i(\cdot)$ will be designed in a way that the energy resource power outputs will continuously pursue solutions of an OPF problem.

A prototypical AC OPF problem, which is utilized to optimize the operation of the distribution feeder at time $k\tau$, can be formulated as follows:

$$(OPF^k) \min_{v,i,\{P_i, Q_i\}_{i \in \mathcal{G}}} h^k(\{V_i\}_{i \in \mathcal{N}}) + \sum_{i \in \mathcal{G}} f_i^k(P_i, Q_i) \quad (4a)$$

subject to (1), and $$V_i I_i^* = P_i - P_{\ell,i}^k + j(Q_i - Q_{\ell,i}^k), \forall i \in \mathcal{G} \quad (4b)$$

$$V_n I_n^* = -P_{\ell,n}^k - jQ_{\ell,n}^k, \forall n \in \mathcal{N} \backslash \mathcal{G} \quad (4c)$$

$$V^{min} \leq |V_i| \leq V^{max}, \forall i \in \mathcal{M} \quad (4d)$$

$$(P_i, Q_i) \in \mathcal{Y}_i^k, \forall i \in \mathcal{G}, \quad (4e)$$

where $V^{min}$ and $V^{max}$ are minimum and maximum, respectively, voltage service limits (e.g., ANSI C.84.1 limits), $\mathcal{M} \subseteq \mathcal{N}$ is a set of nodes strategically selected to enforce voltage regulation throughout the distribution network, $f_i^k(P_i, Q_i)$ is a time-varying function specifying performance objectives for the ith energy resource (e.g., cost of/reward for ancillary service provisioning, or feed-in tariffs), and $h^k(\{V_i\}_{i \in \mathcal{N}})$ captures system-level objectives (e.g., power losses and/or deviations from the nominal voltage profile). It is well-known that (4) is a nonconvex (in fact, NP-hard) nonlinear program. Related art centralized and distributed solution approaches may not be able to solve $(OPF^k)$ and dispatch setpoints fast enough to cope with fast changes in the demand and ambient conditions at the grid edge (see e.g., FIG. 1), and might regulate the power-outputs $\{P^i Q^i\}_{i \in \mathcal{G}}$ around outdated setpoints (leading to suboptimal operation and potential violations of voltage and security limits). This may be particularly relevant for distributed solution approaches, whereby the power commands are updated at a slow time scale, dictated by the convergence time of the distributed algorithm. In contrast, the objective of (3) is to update the power setpoints at a fast time scale (e.g., in real-time or near-real-time), and in a way that the inverter outputs are continuously regulated to a solution of $(OPF^k)$.

The techniques described herein provide one example of how to design the control function (3a). Firstly, a linear approximation of the power flow equations is utilized. One example method for obtaining a linear approximation is discussed in Guggilam and is briefly described herein. A similar approach is proposed in S. Dhople et al., *Linear approximations to ac power flow in rectangular coordinates*, Allerton Conference on Communication, Control, and Computing, in Press, 2015 (hereinafter "Dhople"), which is incorporated herein by reference. These approximations may be helpful in developing DER control that is low-complexity and fast acting. For notation simplicity in the following portion, the superscript k indexing the time instant $k\tau$ is dropped from all electrical and network quantities.

Let $s := [S_1, \ldots, S_N] \in \mathbb{C}^N$ collect the net power injected at nodes $\mathcal{N}$, where $S_i = P_i - P_{l,i} + j(Q_i - Q_{l,i})$ for $i \in \mathcal{G}$, and $S_i = -$ $P_{l,i} - jQ_{l,i}$ for $i \in \mathcal{N} \setminus \mathcal{G}$ (cf. (4b)(4c)). Similarly, collect the voltage magnitudes $\{|V_i|\}_{i \in \mathcal{N}}$ in $\rho := [|V_1|, \ldots, |V_N|]^T \in \mathbb{R}^N$. The objective is to obtain approximate power-flow relations whereby voltages are linearly related to injected powers s as $$v \approx Hp + Jq + b \quad (5a)$$

$$\rho \approx Rp + Bq + a, \quad (5b)$$

where $p := \Re\{s\}$ and $q := \Im\{s\}$. This way, the voltage constraints (4d) can be approximated as $V^{min} \mathbf{1}_N \leq Rp + Bq + a \leq V^{max} \mathbf{1}_N$, while power-balance is intrinsically satisfied at all nodes; further, relevant electrical quantities of interest appearing in the function $h^k(\{V_i\}_{i \in \mathcal{N}})$ in (4a), e.g., power losses, can be expressed as linear functions of p and q. What is more, by using (5a)-(5b), function $h^k(\{V_i\})hk$ can be re-expressed as $\Sigma_{i \in \mathcal{G}} h_i^k(P_i, Q_i)$. Following Guggilam and Dhople, the matrices R, B, H, J and the vectors a, b are obtained next.

To this end, (4b)-(4c) can be re-written in a compact form as $$s = \text{diag}(v)i^* = \text{diag}(v)(Y^* v^* + \overline{y}^* V_o^*) \quad (6)$$

and the AC power-flow equation can be linearized around a given voltage profile $\overline{v} := [\overline{V}_1, \ldots, \overline{V}_N]^T$. In the following, the voltages v satisfying the nonlinear power-balance equations (6) are expressed as $v = \overline{v} + e$, where the entries of e capture deviations around the linearization points $\overline{v}$. For future developments, collect in the vector $\overline{\rho} \in \mathbb{R}_+^N$ the magnitudes of voltages $\overline{v}$, and let $\overline{\xi} \in \mathbb{R}^N$ and $\overline{\vartheta} \in \mathbb{R}^N$ collect elements $\{\cos(\overline{\theta}_n)\}$ and $\{\sin(\overline{\theta}_n)\}$, respectively, where $\overline{\theta}_i$ is the angle of the nominal voltage $\overline{V}_i$.

By replacing v with $\overline{v} + e$ in (6) and discarding the second-order terms in e (e.g., discarind terms such as $\text{diag}(e)Y^* e^*$), equation (6) can be approximated as $$\Gamma e + \Phi e^* = s + v, \quad (7)$$

where matrices $\Gamma$ and $\Phi$ are given by $\Gamma := \text{diag}(Y^* \overline{v}^* + \overline{y}^* V_o^*)$ and $\Phi := \text{diag}(\overline{v})Y^*$, and $v := -\text{diag}(\overline{v})(Y^* \overline{v}^* + \overline{y}^* V_o^*)$. Equation (7) provides an approximate linear relationship between the injected complex powers and the voltage. In the following, (7) will be further simplified by suitably selecting the nominal voltage profile, $\overline{v}$. To this end, notice first that matrix Y is invertible, and consider the following choice of the nominal voltage $\overline{v}$:

$$\overline{v} = -Y^{-1} \overline{y} V_o. \quad (8)$$

By using (8), it is apparent that $\Gamma = 0_{N \times N}$ and $v = 0_N$, and therefore the linearized power-flow can be expressed as $$\text{diag}(\overline{v}^*) Ye = s^*. \quad (9)$$

A solution to (9) can be expressed as $e = Y^{-1} \text{diag}^-(\overline{v}^*)s^*$. Expanding on this relation, the approximate voltage-power relationship (5a) can be obtained by defining the matrices:

$$\overline{R} = Z_R \text{diag}(\overline{\xi})(\text{diag}(\overline{\rho}))^{-1} - Z_I \text{diag}(\overline{\vartheta})(\text{diag}(\overline{\rho}))^{-1} \quad (10a)$$

$$\overline{B} = Z_I \text{diag}(\overline{\xi})(\text{diag}(\overline{\rho}))^{-1} + Z_R \text{diag}(\overline{\vartheta})(\text{diag}(\overline{\rho}))^{-1}, \quad (10b)$$

where $Z_R := \Re\{Y^{-1}\}$ and $Z_I := \Im\{Y^{-1}\}$, and setting $H = \overline{R} + j\overline{B}$, $J = \overline{B} - j\overline{R}$, and $b = \overline{v}$. If the entries of $\overline{v}$ dominate those in e, then $\overline{\rho} + \Re\{e\}$ serves as a first-order approximation to the voltage magnitudes across the power distribution network, and relationship (5a) can be obtained by setting $R = \overline{R}$, $B = \overline{B}$, and $a = \overline{\rho}$. Analytical error bounds for (5a)(5b) are provided in Dhople; the numerical experiments provided in Gugillam demonstrate that (5a)-(5b) yield very accurate representations of the power flow equations.

Computationally affordable DER control pursuing solutions to (4) may be developed beginning with the derivation of a convex surrogate for the target OPF problem by leveraging (5) and (10). Particularly, by using (5b), the voltage magnitude at node $n \in \mathcal{M}$ and time k can be approximated as $|V_n^k| \approx \Sigma_{i \in \mathcal{G}} [r_{n,i}^k (P_i - P_{l,i}^k) + b_{n,i}^k (Q_i - Q_{l,i}^k)] + c_n^k$, with $c_n^k := \overline{\rho}_n^k - \Sigma_{i \in \mathcal{N} \setminus \mathcal{G}} (r_{n,i}^k P_{l,i}^k + b_{n,i}^k Q_{l,i}^k)$. It follows that problem (4) can be approximated as:

$$(P1^k) \min_{\{u_i\}_{i \in \mathcal{G}}} \sum_{i \in \mathcal{G}} \overline{f}_i^k(u_i) \quad (11a)$$

subject to $$g_n^k(\{u_i\}_{i \in \mathcal{G}}) \leq 0, \forall n \in \mathcal{M} \quad (11b)$$

$$\overline{g}_n^k(\{u_i\}_{i \in \mathcal{G}}) \leq 0, \forall n \in \mathcal{M} \quad (11c)$$

$$u_i \in \mathcal{Y}_i^k, \forall i \in \mathcal{G}, \quad (11d)$$

where $u_i := [P_i, Q_i]^T$, function $\overline{\mathcal{F}}_i^k(u_i)$ is defined as $\overline{\mathcal{F}}_i^k(u_i) := f_i^k(u_i) + h_i^k(u_i)$ for brevity, and $$g_n^k(\{u_i\}_{i \in \mathcal{G}}) := V^{min} - c_n^k - \sum_{i \in \mathcal{G}} [r_{n,i}^k (P_i - P_{\ell,i}^k) + b_{n,i}^k (Q_i - Q_{\ell,i}^k)] \quad (12a)$$

$$\overline{g}_n^k(\{u_i\}_{i \in \mathcal{G}}) := \sum_{i \in \mathcal{G}} [r_{n,i}^k (P_i - P_{\ell,i}^k) + b_{n,i}^k (Q_i - Q_{\ell,i}^k)] + c_n^k - V^{max}. \quad (12b)$$

The sets $\mathcal{Y}_i^k$, $i \in \mathcal{G}$, are convex, closed, and bounded for all $k \geq 0$ (cf. (2)). For future developments, define the set $\mathcal{Y}^k := \mathcal{Y}_1^k \times \ldots \mathcal{Y}_{N_\mathcal{G}}^k$. Again, the 2M constraints (11), $M := |\mathcal{M}|$, are utilized to enforce voltage regulation (cf. (4d) and (5b)). Additional constraints can be considered in (OPF$^k$) and (P1$^k$), but this may not affect the design of the energy resource control techniques described herein.

Regarding (11), the following assumptions may be made.

Assumption 1. Functions $f_i^k(u_i)$ and $h_i^k(u_i)$ are convex and continuously differentiable for each $i \in \mathcal{G}$ and $k \geq 0$. Define further the gradient map:

$$f^k(u) := [\nabla_{u_1}^T \overline{\mathcal{F}}_1^k(u_1), \ldots, \nabla_{u_{N_\mathcal{G}}}^T \overline{\mathcal{F}}_{N_\mathcal{G}}^k(u_{N_\mathcal{G}})]^T. \quad (13)$$

Then, it may be assumed that the gradient map $f^k: \mathbb{R}^{2N_\mathcal{G}} \to \mathbb{R}^{2N_\mathcal{G}}$ is Lipschitz continuous with constant L over the compact set $\mathcal{Y}^k$ for all $k \geq 0$; that is, $\|f^k(u) - f^k(u')\|_2 \leq L \|u - u'\|_2$, $\forall u, u' \in \mathcal{Y}^k$.

Assumption 2 (Slater's condition). For all $k \geq 0$, there exist a set of feasible power injections $\{\hat{u}_i^k\}_{i \in \mathcal{G}} \in \mathcal{Y}^k$ such that $g_n^k(\{\hat{u}_i\}_{i \in \mathcal{G}}) < 0$ and $\overline{g}_n^k(\{\hat{u}_i\}_{i \in \mathcal{G}}) < 0$, for all $n \in \mathcal{M}$ From the compactness of set $\mathcal{Y}^k$, and under Assumptions 1 and 2, problem (11) is convex and strong duality holds. Further, there exists an optimizer at each time $k \geq 0$, which will be hereafter denoted as $\{u_i^{opt,k}\}_{i \in \mathcal{G}}$. For future developments, let $g^k(u) \in \mathbb{R}^M$ and $\overline{g}^k(u) \in \mathbb{R}^M$ be a vector stacking all the functions $g_n^k(\{u_i\}_{i \in \mathcal{G}})$, $n \in \mathcal{M}$ and $\overline{g}_n^k(\{u_i\}_{i \in \mathcal{G}})$, $n \in \mathcal{M}$, respectively. Then, given that these functions are linear in u, it follows that there exists a constant G such that $\|\nabla_u g^k(u)\|_2 \leq G$ and $\|\nabla_u \overline{g}^k(u)\|_2 \leq G$ for all $u \in \mathcal{Y}^k$ for all $k \geq 0$.

The cost functions $\{\overline{\mathcal{F}}_i^k(u_i)\}_{i \in \mathcal{G}}$ are not required to be strongly convex. In contrast, the convergence properties of some related art distributed control schemes hinge on the strong convexity of the target cost functions. Lastly, in this case, Slater's condition is tantamount to saying that there exists at least one configuration of the inverter output powers so that voltages are strictly within limits $V^{min}$ and $V^{max}$.

Let $\mathcal{L}^k(u^k, \gamma, \mu)$ denote the Lagrangian function associated with problem (11), where $\gamma:=[\gamma_1, \ldots, \gamma_M]^T$ and $\mu:=[\mu_1, \ldots, \mu_M]^T$ collect the Lagrange multipliers associated with (11b) and (11c), respectively. Further, let $u:=[(u_1)^T, \ldots, (u_{N_G})^T]^T$ for brevity. Upon rearranging terms, the Lagrangian function can be expressed as $$\mathcal{L}^k(u, \gamma, \mu) := \sum_{i \in \mathcal{G}} \bar{f}_i^k(P_i, Q_i) + (P_i - P_{\ell,i}^k)(\check{r}_i^k)^T(\mu - \gamma) + \quad (14)$$

$$(Q_i - Q_{\ell,i}^k)(\check{b}_i^k)^T(\mu - \gamma) + (c^k)^T(\mu - \gamma) + \gamma^T 1_m V^{min} - \mu^T 1_m V^{max}$$

where $\check{r}_i^k := [\{r_{j,i}^k\}_{j \in \mathcal{M}}]^T$ and $\check{b}_i^k := [\{b_{j,i}^k\}_{j \in \mathcal{M}}]^T$ are M×1 vectors collecting the entries of $R^k$ and $B^k$ in the ith column and rows corresponding to nodes in $\mathcal{M}$, and $c^k := [\{c_j^k\}_{j \in \mathcal{M}}]^T$. From the compactness of $\{\chi_i^k\}_{i \in \mathcal{G}}$ and Slater's condition, it follows that the optimal dual variables live in a compact set. In lieu of $\mathcal{L}^k(u^k, \gamma, \mu)$, consider the following regularized Lagrangian function $$\mathcal{L}_{\nu,\epsilon}^k(u, \gamma, \mu) := \mathcal{L}^k(u, \gamma, \mu) + \frac{\nu}{2}\|u\|_2^2 - \frac{\epsilon}{2}(\|\gamma\|_2^2 + \|\mu\|_2^2) \quad (15)$$

where the constant $\nu > 0$ and $\epsilon > 0$ appearing in the Tikhonov regularization terms are design parameters. Function (15) is strictly convex in the variables u and strictly concave in the dual variables $\gamma, \mu$. The upshot of (15) is that gradient-based approaches can be applied to (15) to find an approximate solution to (P1$^k$) with improved convergence properties. Further, this may allow for dropping the strong convexity assumption on $\{\bar{f}_i^k(u_i)\}_{i \in \mathcal{G}}$ and avoiding averaging of primal and dual variables. Accordingly, the following saddle-point problem may be formed:

$$\max_{\gamma \in \mathbb{R}_+^M, \mu \in \mathbb{R}_+^M} \min_{u \in \mathcal{Y}^k} \mathcal{L}_{\nu,\epsilon}^k(u, \gamma, \mu) \quad (16)$$

denoting as $\{u_i^{*,k}\}_{i \in \mathcal{G}}$, $\gamma^{*,k}$, $\mu^{*,k}$ the unique primal-dual optimizer of (15) at time k.

In general, the solutions of (11) and the regularized saddle-point problem (16) are expected to be different; however, the discrepancy between $u_i^{opt,k}$ and $u_i^{*,k}$ can be bounded as in Lemma 3.2 of Koshal, whereas bounds of the constraint violation are substantiated in Lemma 3.3 of Koshal. These bounds are proportional to $\sqrt{\epsilon}$. Therefore, the smaller $\epsilon$, the smaller is the discrepancy between $u_i^{opt,k}$ and $u_i^{*,k}$.

As a result, the following primal-dual gradient method may be used to solve the time-varying saddle-point problem of (16):

$$\bar{u}_i^{k+1} = \text{proj}_{\mathcal{Y}_i^k}\{\tilde{u}_i^k - \alpha \nabla_{u_i} \mathcal{L}_{\nu,\epsilon}^k(u, \gamma, \mu)|_{\tilde{u}_i^k, \tilde{\gamma}^k, \tilde{\mu}^k}\}, \forall i \in \mathcal{G} \quad (17a)$$

$$\tilde{\gamma}_n^{k+1} = \text{pro}_{\mathbb{R}_+}\{\tilde{\gamma}_n^k + \alpha(g_n^k(\tilde{u}^k) - \epsilon \tilde{\gamma}_n^k)\}, \forall n \in \mathcal{M} \quad (17b)$$

$$\tilde{\mu}_n^{k+1} = \text{pro}_{\mathbb{R}_+}\{\tilde{\mu}_n^k + \alpha(\bar{g}_n^k(\tilde{u}^k) - \epsilon \tilde{\mu}_n^k)\}, \forall n \in \mathcal{M} \quad (17c)$$

where $\alpha > 0$ is the stepsize and $\text{proj}_\mathcal{Y}\{u\}$ denotes the projection of u onto the convex set $\mathcal{Y}$; particularly, $\text{pro}_{\mathbb{R}_+}\{u\} = \max\{0, u\}$, whereas (17a) depends on the inverter operating region (cf. (2)) and can be computed in closed-form. For the time-invariant case (i.e., $\bar{f}_i^k(u_i) = \bar{f}_i(u_i)$, $g_n^k(u) = g_n(u)$, and $\bar{g}_n^k(u) = \bar{g}_n(u)$ for all k>0), convergence of (17) is established in Koshal. For the time-varying case at hand, which captures the variability of underlying operating conditions at the grid edge (cf. FIG. 1), it may be appropriate to introduce additional assumptions to substantiate the discrepancy between the optimization problems that are associated with consecutive time instants.

Assumption 3. There exists a constant $\sigma \geq 0$ such that $\|u^{*,k+1} - u^{*,k}\| \leq \sigma_u$ for all $k \geq 0$.

Assumption 4. There exist constants $\sigma_d \geq 0$ and $\sigma_{\bar{d}} \geq 0$ such that $|g_n^{k+1}(u^{*,k+1}) - g_n^k(u^{*,k})| \leq \sigma_d$ and $|\bar{g}_n^{k+1}(u^{*,k+1}) - \bar{g}_n^k(u^{*,k})| \leq \sigma_{\bar{d}}$, respectively, for all $n \in \mathcal{M}$ and $k \geq 0$.

It can be shown that the conditions of Assumption 4 translate into bounds for the discrepancy between the optimal dual variables over two consecutive time instants. That is, $\|\gamma^{*,k+1} - \gamma^{*,k}\| \leq \sigma_\gamma$ and $\|\mu^{*,k+1} - \mu^{*,k}\| \leq \sigma_\mu$ with $\sigma_\gamma$ and $\sigma_\mu$ given by Prop. 1 of Simonetto. Upon defining $z^{*,k} := [(u^{*,k})^T, (\gamma^{*,k})^T, (\mu^{*,k})^T]^T$ it also follows that $\|z^{*,k+1} - z^{*,k}\| \leq \sigma_z$ for a given $\sigma_z \geq 0$. Under Assumptions 1-4, convergence of (17) are investigated in Theorem 1 of Simonetto.

Similar to some distributed optimization schemes, updating the power setpoints of DERs via (17) leads to a setup where the optimization algorithm is decoupled from the physical system, and the power setpoints are updated in an open-loop fashion. In some examples, a feedback control architecture may be used to enable adaptability to changing operating conditions. For instance, actionable feedback from the distribution network system may be incorporated in (17).

Let $y_n^k$ denote a measurement of $|V_n^k|$ acquired at time k from node $n \in \mathcal{M}$ of the feeder. As a result, the following strategy may be used to update the inverter setpoints of DERs at each time k:

[S1] Collect voltage measurements $\{y_n^k\}_{n \in \mathcal{M}}$.

[S2] For all $n \in \mathcal{M}$, update dual variables as follows:

$$\gamma_n^{k+1} = \text{pro}_{\mathbb{R}_+}\{\gamma_n^k + \alpha(V^{min} - y_n^k - \epsilon \gamma_n^k)\} \quad (18a)$$

$$\mu_n^{k+1} = \text{pro}_{\mathbb{R}_+}\{\mu_n^k + \alpha(y_n^k - V^{max} - \epsilon \mu_n^k)\}. \quad (18b)$$

[S3] Update power setpoints for each DER $i \in \mathcal{G}$ as:

$$u_i^{k+1} = \text{proj}_{\mathcal{Y}_i^k}\{u_i^k - \alpha \nabla_{u_i} \mathcal{L}_{\nu,\epsilon}^k(u, \gamma, \mu)|_{u_i^k, \gamma^k, \mu^k}\} \quad (18c)$$

And go to [S1].

Figure 3:
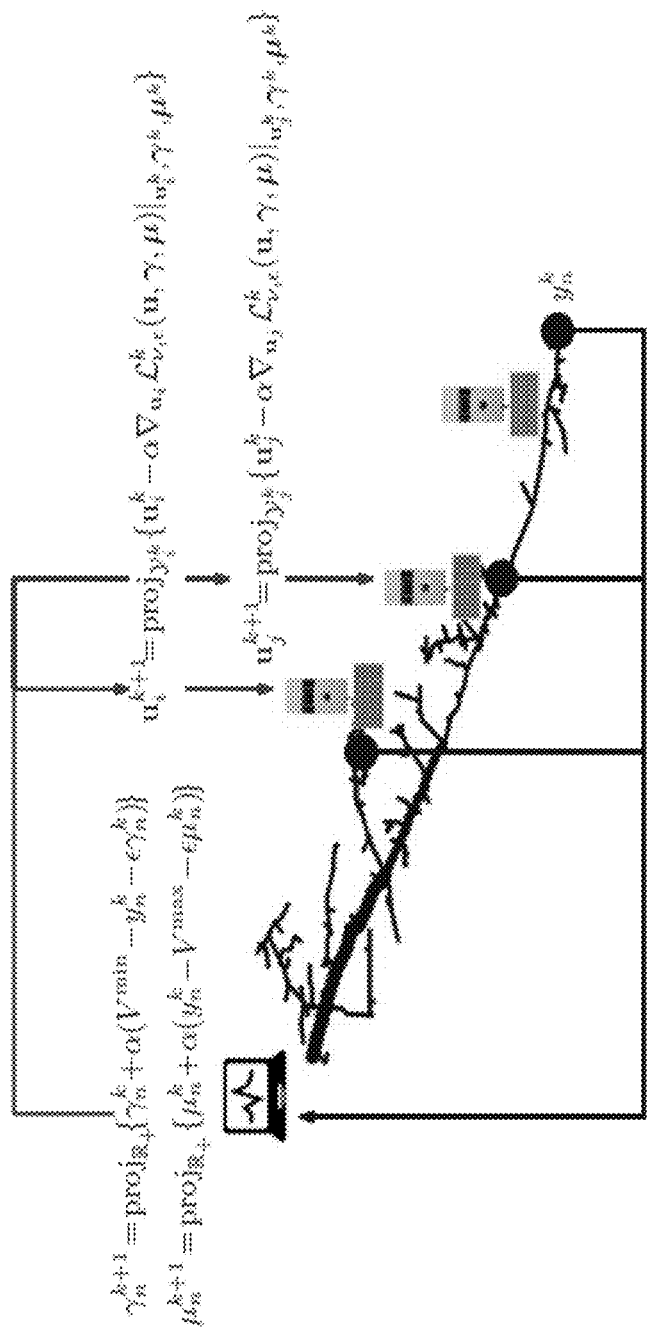
FIG. 3 is a conceptual diagram illustrating an example power distribution network system configured to regulate voltage through gather and broadcast techniques, in accordance with one or more aspects of the present disclosure.

FIG. 3 is a conceptual diagram illustrating an example power distribution network system configured to regulate voltage through gather and broadcast techniques, in accordance with one or more aspects of the present disclosure. Specifically, the power distribution network system of FIG. 3 implements the control techniques defined by (18). In the example of FIG. 3, the update (18c) is performed locally at each inverter-interfaced energy resource and affords a closed-form solution for a variety of sets $\mathcal{Y}_i^k$. Updates (18a) and (18b) may be computed either at each inverter-interfaced energy resource (e.g., if the voltage measurements are broadcasted to the DERs) or at the utility/aggregator.

The control techniques implemented in FIG. 3 (e.g. (18c)) may produce a (continuous-time) reference signal $u_i(t)$ for DER i that has step changes at instants $\{\tau k\}_{k \geq 0}$, is a left-continuous function, and takes the constant value $u_i^{k+1}$ over the time interval $(\tau k, \tau(k+1)]$. Differently from traditional distributed optimization schemes, (18) does not require knowledge of the loads at locations $\mathcal{N} \setminus \mathcal{G}$. The only information required to implement these control techniques pertains to the line and network models, which are utilized to build the network-related matrices in (5). The convergence properties of these control techniques are analyzed herein.

Steps (18a)-(18b) are $\epsilon$-gradients of the regularized Lagrangian function. That is, $V_n^{min} - y_n^k - \epsilon \gamma_n^k \neq \nabla_{\gamma_n} \mathcal{L}_{\nu,\epsilon}^k|_{u^k,\gamma^k,\mu^k}$ and $y_n^k - V_{max} - \epsilon \mu_n^k \neq \nabla_{\mu_n} \mathcal{L}_{\nu,\epsilon}^k|_{u^k,\gamma^k,\mu^k}$. This may be due to i) voltage measurements errors, ii) approximation errors introduced by (5b), and/or iii) setpoints possibly updated at a faster rate that the power-output settling time for off-the-shelf inverters. The latter point may be important, because updates (18) can be conceivably performed at a very fast time scale (e.g., $\tau$ can be on the order of the subsecond). In fact, iterates $u_i^{k+1}$, $\gamma_n^{k+1}$, and $\mu_n^{k+1}$ and may be updated via basic mathematical operations, and low latencies can be achieved with existing communications technologies.

Let $e_\gamma^k \in \mathbb{R}^M$ and $e_\mu^k \in \mathbb{R}^M$ collect the dual gradient errors $V_n^{min} - y_n^k - \epsilon \gamma_n^k - \nabla_{\gamma_n} \mathcal{L}_{\nu,\epsilon}^k$ and $y_n^k - V_n^{max} - \epsilon \mu_n^k - \nabla_{\mu_n} \mathcal{L}_{\nu,\epsilon}^k$, respectively. The following practical assumption can be made.

Assumption 5. There exists a constant $e \geq 0$ such that $\max\{\|e_\gamma^k\|_2, \|e_\mu^k\|_2\} \leq e$ for all $k \geq 0$.

Before stating the main convergence result for the energy resource control devices illustrated in FIG. 3, it may be convenient to introduce relevant definitions as well as a supporting lemma. Recall that $\tilde{z}^k := [(\tilde{u}^k)^T, (\tilde{\gamma}^k)^T, (\tilde{\mu}^k)^T]^T$, and define the time-varying mapping $\Phi^k$ as $$\Phi^k: \{\tilde{u}^k, \tilde{\gamma}^k, \tilde{\mu}^k\} \mapsto \begin{bmatrix} \nabla_{u_1} \mathcal{L}_{\nu,\epsilon}^k(u,\gamma,\mu)|_{\tilde{u}_1^k,\tilde{\gamma}^k,\tilde{\mu}^k} \\ \vdots \\ \nabla_{u_{N_G}} \mathcal{L}_{\nu,\epsilon}^k(u,\gamma,\mu)|_{\tilde{u}_{N_G}^k,\tilde{\gamma}^k,\tilde{\mu}^k} \\ -(\tilde{g}_1^k(\tilde{u}^k) - \epsilon \tilde{\gamma}_1^k) \\ \vdots \\ -(\tilde{g}_M^k(\tilde{u}^k) - \epsilon \tilde{\gamma}_M^k) \\ -(\tilde{g}_1^k(\tilde{u}^k) - \epsilon \tilde{\mu}_1^k) \\ \vdots \\ -(\tilde{g}_M^k(\tilde{u}^k) - \epsilon \tilde{\mu}_M^k) \end{bmatrix}$$

which is utilized to compute the gradients in the error-free iterates (17) as $$\tilde{z}^{k+1} = \text{proj}_{\mathcal{Y}^k \times \mathbb{R}_+^M \times \mathbb{R}_+^M} \{\tilde{z}^k - \alpha \Phi^k(\tilde{z}^k)\}. \tag{19}$$

Given these definitions, the following holds.

Lemma 1: The map $\Phi^k$ is strongly monotone with constant $\eta = \min\{\nu,\epsilon\}$ and Lipschitz over $\mathcal{Y}^k \times \mathbb{R}_+^M \times \mathbb{R}_+^M$ with constant $L_{\nu,\epsilon} = \sqrt{(L+\nu+2G)^2 + 2(G+\epsilon)^2}$.

The result above is a relaxed version of Lemma 3.4 of Koshal, since it does not require the Lipschitz continuity of the gradient of (11b)(11c). Convergence and tracking properties of the described control techniques (18) are established next.

Theorem 1: Consider the sequence $\{z^k\} := \{u^k, \gamma^k, \mu^k\}$ generated by (18). Let Assumptions 1-5 hold. For fixed positive scalars $\epsilon$, $\nu > 0$, if the stepsize $\alpha > 0$ is chosen such that $$\rho(\alpha) := \sqrt{1 - 2\eta\alpha + \alpha^2 L_{\nu,\epsilon}^2} < 1, \tag{20}$$

That is $0 < \alpha < 2\eta/L_{\nu,\epsilon}^2$, then the sequence $\{z^k\}$ converges Q-linearly to $z^{*,k} := \{u^{*,k}, \gamma^{*,k}, \mu^{*,k}\}$ up to the asymptotic error bound given by:

$$\limsup_{k \to \infty} \|z^k - z^{*,k}\|_2 = \frac{1}{1-\rho(\alpha)}[\sqrt{2}\alpha e + \sigma_z]. \tag{21}$$

Equation (21) quantifies the maximum discrepancy between the iterates $\{u^k, \gamma^k, \mu^k\}$ generated by the described control techniques and the (time-varying) minimizer of problem (16). From Lemma 3.2 of Koshal and by using the triangle inequality, a bound for the difference between $u^k$ and the time-varying solution of (11) can be obtained. The condition (20) imposes the requirements on the stepsize $\alpha$, such that $\rho(\alpha)$ is strictly less than 1 and thereby enforcing Q-linear convergence. The optimal stepsize selection for convergence is $\alpha = \eta/L_{\nu,\epsilon}^2$.

The error (21) provides trade-offs between smaller $\alpha$'s (leading to a smaller term multiplying the gradient error e, and yet yielding poorer convergence properties, i.e., $\rho(\alpha)$ close to 1) and bigger $\alpha$'s (leading to the opposite).

For notational and exposition simplicity, the present disclosure addresses a balanced distribution network. However, the techniques described herein may be applicable to multi-phase unbalanced systems with any topology. In fact, the linearized models of the present disclosure may be readily extended to the multi-phase unbalanced setup, and the control techniques (18) can be implemented using inverters located at any phase and node.

Of note, Assumption 2 requires the objective function (11a) to be continuously differentiable. However, non-differentiable functions such as $|x|$ and $|x|_+ := \max\{0,x\}$ (with the latter playing an important role when feed-in tariffs are considered) can be readily handled upon introducing auxiliary optimization variables along with appropriate inequality constraints.

For example, the problem $\min_x [x]_+$ s.t. $g(x) \leq 0$ can be reformulated in the following equivalent way: $\min_{x,z} z$ s.t. $g(x) \leq 0$, $x \leq z$, and $z \geq 0$.

Some related art OPF approaches may include voltage regulation constraints at all nodes. In accordance with the techniques described herein, the set $\mathcal{M}$ corresponds to M nodes where voltage measurements can be collected and utilized as actionable feedback in (18). Accordingly, the set $\mathcal{M}$ may include: i) nodes $\mathcal{G}$ where DERs are located (e.g., existing inverters that accompany renewable energy resources may be equipped with modules that measure the voltage at the point of connection); and, ii) additional nodes of a distribution network where distribution network system operators deploy communications-enabled meters for voltage monitoring.

The scalars $\sigma_u$, $\sigma_d$ and $\sigma_{\tilde{q}}$ (and, thus, $\sigma_z$) in Assumption 3 and Assumption 4 quantify the variability of the ambient and network conditions over the time interval $[\tau k, \tau(k+1)]$ as well as the (maximum) discrepancy between OPF solutions corresponding to two consecutive time instants $\tau k$ and $\tau(k+1)$ (cf. FIG. 3). On the other hand, parameter e implicitly bounds the error between the setpoint $u_i^k$ commanded to the inverter and the actual inverter output, and it is related to the inverter's actuation time. It is worth pointing out that the results of Theorem 1 hold for any value of $\tau$ (and, hence, for any values of the scalars $\sigma_u$, $\sigma_d$, $\sigma_{\tilde{q}}$, and $\sigma_z$) and for any value of e. For given dynamics of ambient conditions, network, and problem parameters, $\sigma_z$ and e are utilized to characterize the performance of the control techniques described herein. For example, it is clear that the value of $\sigma_u$ decreases with $\tau$; and, as a consequence, the distance between the output of the described control techniques and the OPF solutions decreases with $\tau$ too (cf. (21)).

As one example application, a power distribution network with high-penetration of photovoltaic (PV) systems is described. Particularly, it is demonstrable how the disclosed control techniques can reliably prevent overvoltages that are likely to be experienced during periods when PV generation exceeds the demand.

Figure 4:
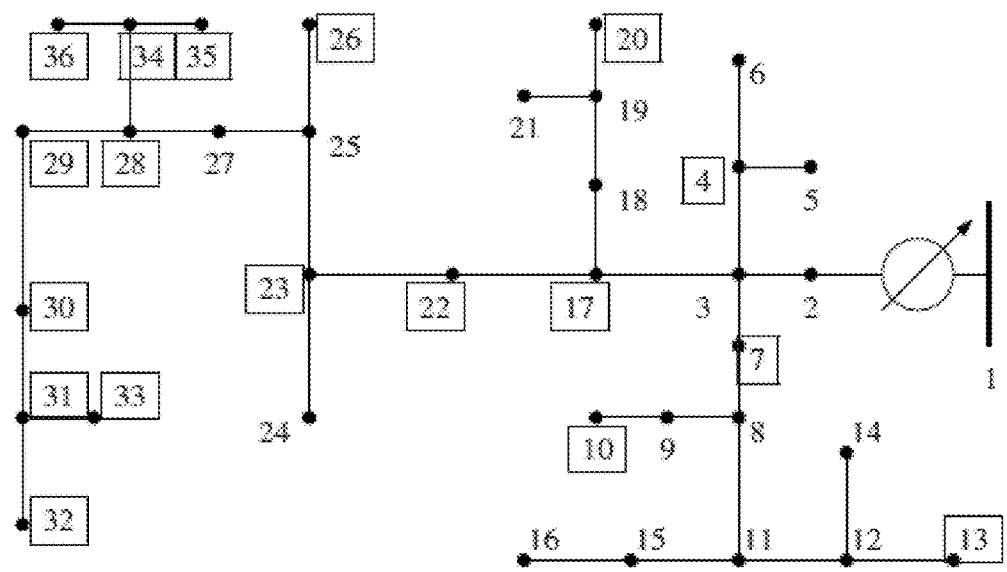
FIG. 4 is a diagram illustrating the IEEE 37-node power distribution test network.

To this end, consider a modified version of the IEEE 37-node test feeder shown in FIG. 4. The modified distribution network is obtained by considering a single-phase equivalent, and by replacing the loads specified in the original dataset with real load data measured from feeders in Anatolia, Calif. during the week of August 2012. The data have a granularity of 1 second and represent the loading of secondary transformers. Line impedances, shunt admittances, and active and reactive loads are adopted from the respective dataset. With reference to FIG. 4, it is assumed that eighteen PV systems are located at nodes 4, 7, 10, 13, 17, 20, 22, 23, 26, 28, 29, 30, 31, 32, 33, 34, 35, and 36, and their generation profile is simulated based on the real solar irradiance data available in J. Bank et al., *Development of a high resolution, real time, distribution-level metering system and associated visualization modeling, and data analysis functions*, National Renewable Energy Laboratory, Tech. Rep. NREL/TP-5500-56610, May 2013 (hereinafter "Bank"). The solar irradiance data have a granularity of 1 second. The rating of these inverters are 300 kVA for i=3, 350 kVA for i=15, 16, and 200 kVA for the remaining inverters. With this setup, when no actions are taken to prevent overvoltages, one would obtain the voltage profile illustrated in FIG. 5A. To facilitate readability, only three voltage profiles are provided.

The voltage limits $V^{max}$ and $V^{min}$ are set to 1.05 pu and 0.95 pu, respectively. The performance of the proposed scheme is compared against the performance of a local Volt/VAr control, one of the control strategies currently tested on the field by a number of DMS vendors and utility companies. Particularly, a droop control without deadband may be tested, where inverters set $Q_n^k=0$ when $|V_n^k|-1$ pu and linearly increase the reactive power to $Q_n^k = \sqrt{S_n^2 - (P_{av,n}^k)^2}$ when $|V_n^k|-1.05$ pu. The PV-inverters measure the voltage magnitude and update the reactive setpoint every 0.33 seconds.

For the control techniques disclosed herein, the parameters are set as $\nu=10^{-3}$, $\epsilon=10^{-4}$, and $\alpha=0.2$. The target optimization objective (11a) is set to $\mathcal{F}^k(u^k) = \Sigma_{i \in \mathcal{G}} c_q(Q_i^k)^2 + c_p(P_{av,i}^k - P_i^k)^2$ in an effort to minimize the amount of real power curtailed and the amount of reactive power injected or absorbed. The coefficients are set to $c_p=3$ and $c_q=1$. Iteration of the control techniques (18) is performed every 0.33 seconds. Before describing the obtained voltage profiles, it is prudent to stress that from Theorem 1 it is evident that the convergence of the control techniques described herein is not affected by the network size.

Figure 5A:
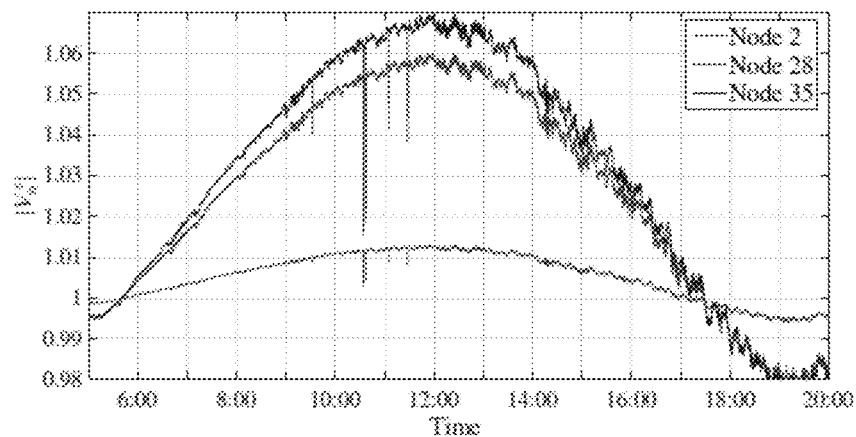
FIGS. 5A-5C are graphical plots illustrating voltage values of various nodes in the test network of FIG. 4, in accordance with one or more aspects of the present disclosure.
Figure 5B:
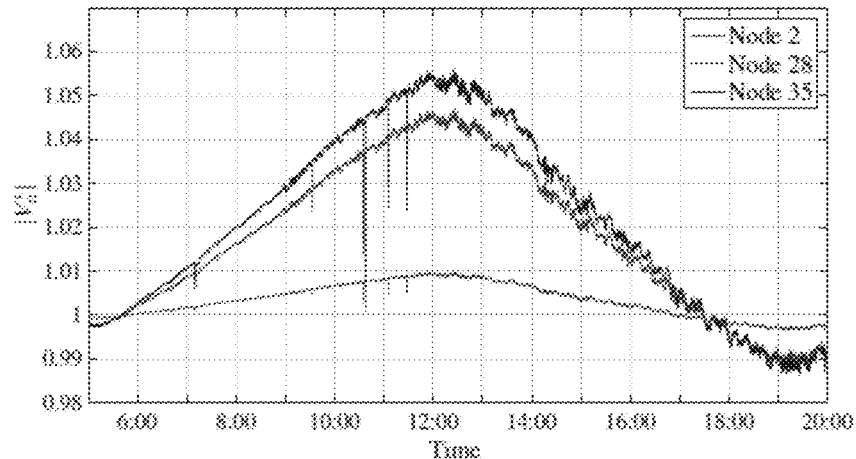
Figure 5C:
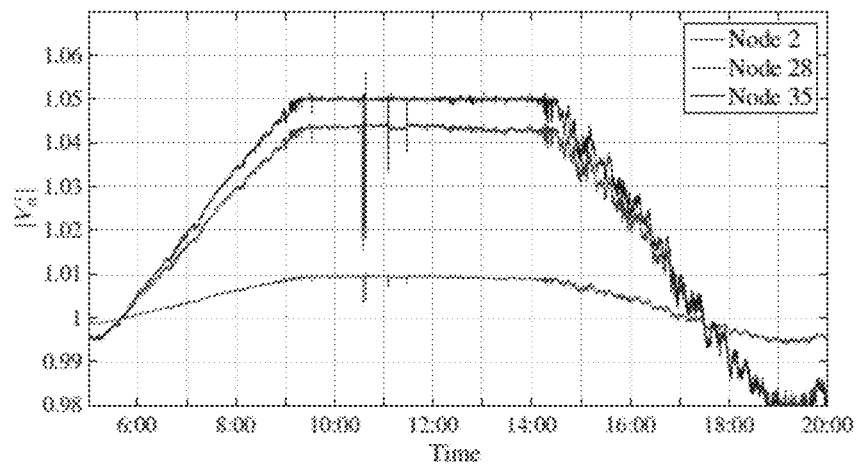

FIG. 5B illustrates the voltage profiles for nodes n=2, 28, and 35 when Volt/VAr control is implemented. The maximum values of the voltage magnitude are obtained at node 35. It can be seen that Volt/VAr control enforces voltage regulation, except for the interval between 11:30 and 13:00. In fact, the available reactive power is upper bounded by $(S_n^2 - (P_{av,n}^k)^2)^{1/2}$, and this bound decreases with the increasing of $P_{av,n}^k$. It follows that in the present test case the inverters do not have sufficient reactive power between 11:30 and 13:00 to enforce voltage regulation. FIG. 5C shows the voltage profile obtained using the control techniques (18). Voltage regulation is enforced, and a flat voltage profile is obtained from 9:30 to 14:00 (cf. FIG. 5A). A flat voltage profile is obtained because in the present test case the control techniques of the present disclosure minimize the amount of real power curtailed and the amount of reactive power provided. Thus, the objective of the control techniques described herein is to ensure voltage regulation while minimizing the deviation from the point $[P_{av,n}^k, 0]^T$. A few flickers are experienced due to rapid variations of the solar irradiance, but the voltage magnitudes are enforced below the limit within 1-2 seconds.

Figure 6:
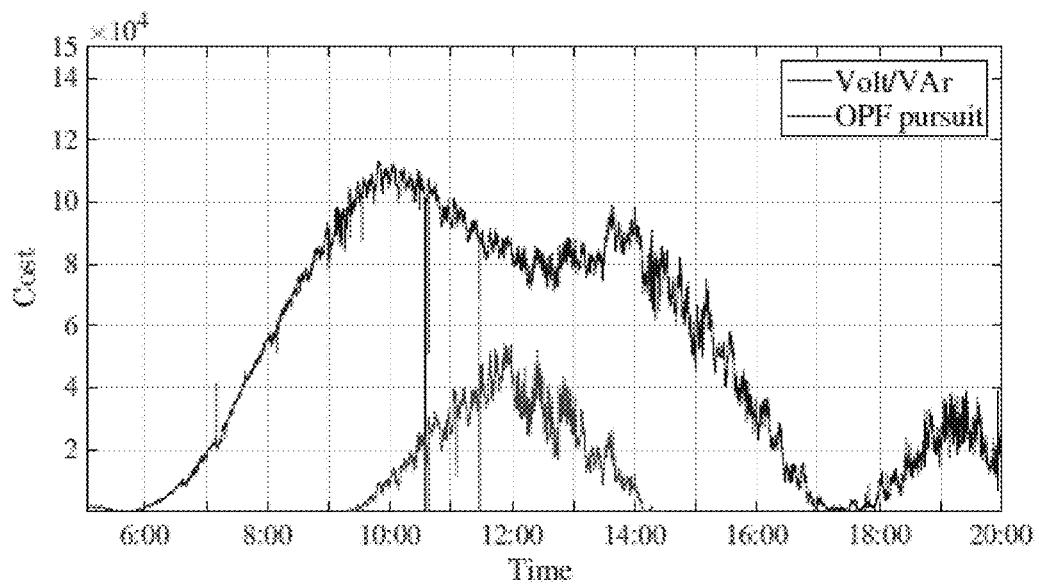
FIG. 6 is a graphical plot illustrating the cost achieved by a power distribution network system configured in accordance with one or more aspects of the present disclosure.

FIG. 6 reports the cost achieved (in terms of active power curtailed and cost of reactive power support) by a distribution network system implementing the control techniques described herein. That is, $\Sigma_{i \in \mathcal{G}} c_q(Q_i^k)^2 + c_p(P_{av,n}^k - P_i^k)^2$. This is compared against the cost of reactive power provisioning entailed by Volt/VAr control, which is computed as $\Sigma_{i \in \mathcal{G}} c_q (Q_i^k)^2$. The advantages of the control techniques described herein are evident, as they enable voltage regulation with minimal curtailment of real power as well as reactive power support. Notice that the lower the amount of reactive power absorbed by the inverters, the lower are the currents on the distribution lines, with the due benefits for the distribution system operators. It is also worth emphasizing that the cost entailed by Volt/VAr is decreasing during solar-peak hours. As mentioned above, this is because the available reactive power is upper bounded by $(S_n^2 - (P_{av,n}^k)^2)^{1/2}$, and this bound decreases with the increasing of $P_{av,n}^k$. However, while the cost decreases around 10:00 12:00, the Volt/VAr controllers are not able to ensure voltage regulation.

Figure 7:
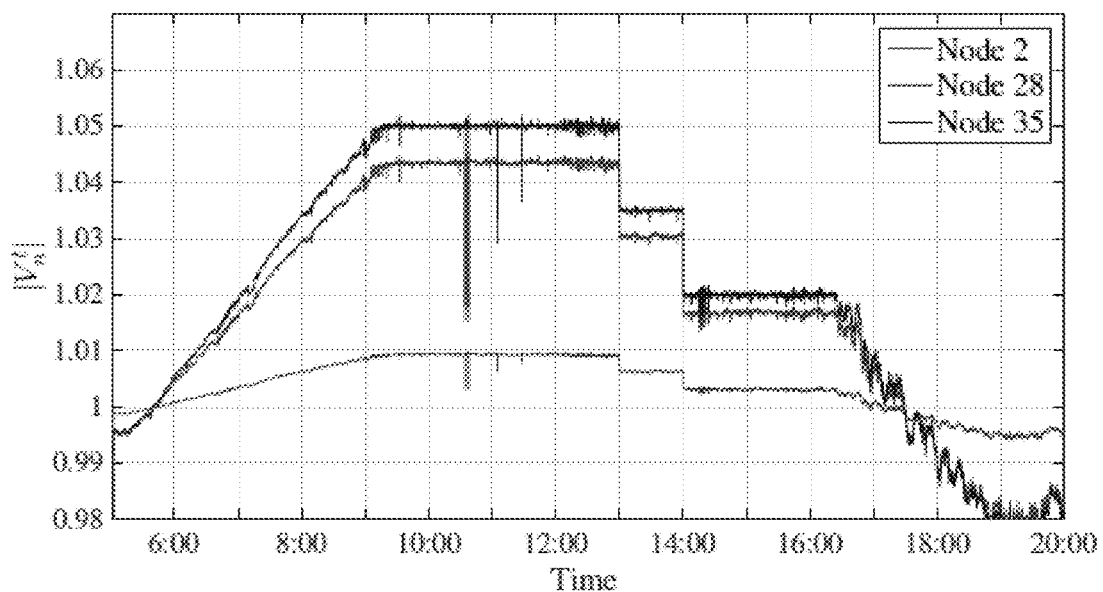
FIG. 7 is a graphical plot illustrating voltage values of nodes in the test network of FIG. 6 during Conservation Voltage Reduction, in accordance with one or more aspects of the present disclosure.

Notice that the voltage magnitudes can be forced to flatten on a different value (e.g., 1.045 pu) by simply adjusting $V^{max}$. Given the obtained trajectories, it is evident that the control techniques described herein can be utilized to also effect Conservation Voltage Reduction by appropriately setting the values of $V^{min}$ and $V^{max}$ in the control loop (cf. (18a) and (18b)). To test the ability of the described control techniques to modify the voltage profile in real time or near-real time, in response to changes in $V^{min}$ and $V^{max}$, consider the case where a distribution network system operator sets the bound $V^{max}$ to: i) 1.05 pu from 6:00 to 13:00; ii) 1.035 from 13:00 to 14:00; and, iii) 1.02 after 14:00. FIG. 7 illustrates the voltage profile obtained by the present setup implementing the described control techniques to effect Conservation Voltage Reduction. It can be clearly seen that the voltages are quickly regulated within the desired bounds.

The setpoint update (18c) affords a closed-form solution for a variety of RESs and other controllable devices. For notational simplicity, let $\hat{u}_n^k = [\hat{P}_n^k, \hat{Q}_n^k]^T$ be the unprojected point, where $\hat{P}_n^k$ and $\hat{Q}_n^k$ are the unprojected values for the real and reactive powers, respectively. That is, $$\hat{u}_n^k := u_n^{k-1} - \alpha \nabla_{u_n} \mathcal{L}_{\nu,\epsilon}^{k-1}(u,\gamma,\mu)|_{u_n^{k-1},\gamma^{k-1},\mu^{k-1}}. \quad (22)$$

Clearly, $u_n^k = \text{proj}_{\mathcal{Y}_n^{k-1}} \{\hat{u}_n^k\}$. In the following, expressions for $u_n^k$ are reported for different choices of the set $\mathcal{Y}_n^{k-1}$.

Real power-only control: in this case, the set $\mathcal{Y}_n^{k-1}$ boils down to $\mathcal{Y}_n^{k-1} = \{(P_n, Q_n): 0 \leq P_n \leq P_{av,n}^k, Q_n = 0\}$. This set is typical in inverter-interfaced RESs adopting real power curtailment-only strategies, where $P_{av,n}^{k-1}$ represents the maximum power point for a RES. It also represents conventional generation unit operating at unity power factor, where $P_{av,n}^{k-1}$ is the maximum generation. In this case, (18c) can be simplified as follows:

$$P_n^k = \max\{0, \min\{\hat{P}_n^k, P_{av,n}^{k-1}\}\} \quad (23a)$$

$$Q_n^k = 0. \quad (23b)$$

Reactive power-only control: For RES with reactive power-only control capability, the set of possible operating points is given by $\mathcal{Y}_n^{k-1} = \{(P_n, Q_n): P_n = P_{av,n}^{k-1}, |Q_n| \leq (S_n^2 - (P_{av,n}^{k-1})^2)^{1/2}\}$. In this case, (18c) boils down to:

$$P_n^k = P_{av,n}^{k-1} \tag{24a}$$

$$Q_n^k = \text{sign}(\hat{Q}_n^k) \min\{|\hat{Q}_n^k|, (S_n^2 - (P_{av,n}^{k-1})^2)^{1/2}\}. \tag{24b}$$

where $\text{sign}(x) = -1$ when $x<0$ and $\text{sign}(x) = 1$ when $x>0$.

Joint real and reactive power control: Consider now the more general setting where an inverter can control both real and reactive output powers. Particularly, given the inverter rating $S_n$ and the current available real power $P_{av,n}^{k-1}$, consider the set $\mathcal{Y}_n^{k-1} = \{(P_n, Q_n): 0 \leq P_n \leq P_{av,n}^k, (Q_n)^2 \leq S_n^2 - (P_n)^2\}$ in (2).

Figure 8:
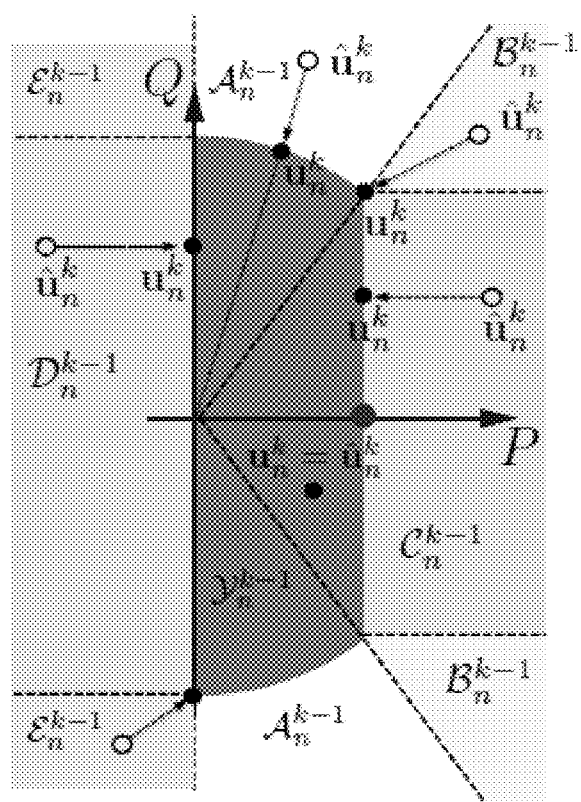
FIG. 8 is a graphical plot illustrating an example operating region for a photovoltaic inverter.

FIG. 8 is a graphical plot illustrating an example operating region for a photovoltaic inverter. Specifically, the example of FIG. 8 illustrates how the power setpoints for a photovoltaic inverter are determined, in accordance with one or more aspects of the present disclosure. With reference to FIG. 8, the setpoints $u_n^k$ can be obtained from the unprojected point $\hat{u}_n^k$ as summarized next:

$$u_n^k = \begin{cases} \hat{u}_n^k, & \text{if } \hat{u}_n^k \in \mathcal{Y}_n^{k-1} \\ \hat{u}_n^k \frac{S_n}{\|\hat{u}_n^k\|}, & \text{if } \hat{u}_n^k \in \mathcal{A}_n^{k-1} \\ \left[P_{av,n}^{k-1}, \text{sign}(\hat{Q}_n^k)(S_n^2 - (P_{av,n}^{k-1})^2)^{\frac{1}{2}}\right]^T, & \text{if } \hat{u}_n^k \in \mathcal{B}_n^{k-1} \\ \left[P_{av,n}^{k-1}, \hat{Q}_n^k\right]^T, & \text{if } \hat{u}_n^k \in \mathcal{C}_n^{k-1} \\ \left[0, \hat{Q}_n^k\right]^T, & \text{if } \hat{u}_n^k \in \mathcal{D}_n^{k-1} \\ \left[0, \text{sign}(\hat{Q}_n^k)S_n\right]^T, & \text{if } \hat{u}_n^k \in \mathcal{E}_n^{k-1} \end{cases} \tag{25}$$

where the regions $\mathcal{A}_n^{k-1}, \mathcal{B}_n^{k-1}, \mathcal{Y}_n^{k-1}, \mathcal{D}_n^{k-1}$, and $\mathcal{E}_n^{k-1}$ can be readily obtained from $S_n$ and $P_{av,n}^{k-1}$.

It is also worth pointing out that closed-form expressions may be found when $\mathcal{Y}_n^{k-1}$ models the operating regions of, diesel generators, and other suitable energy resources.

The above section details the synthesis of feedback controller techniques that seek DER setpoints corresponding to AC OPF solutions. Appropriate linear approximations of the AC power flow equations are utilized along with primal-dual methods to develop fast-acting low-complexity control techniques that can be implemented using microcontrollers and/or other processors that accompany interfaces of gateways and energy resource inverters. The tracking capabilities of these control techniques have also been analytically established and numerically corroborated herein.

In some examples, one or more DERs may be temporarily unable to communicate with a management system for the distribution network. In accordance with the techniques described herein, DERs may be configured to update their setpoints on their own when subjected to such communication constraints. The following portion of the disclosure describes example controller techniques usable under various communications constraints.

As previously described, various centralized and distributed AC OPF approaches have been developed for distribution network systems to compute optimal steady-state setpoints for DERs, so that power losses and voltage deviations are minimized and economic benefits to utility and end-users are maximized. It is well-known that the AC OPF is a nonconvex (and, in fact, NP-hard) nonlinear program. Some related art approaches may utilize off-the-shelf solvers for nonlinear programs, or, leverage convex relaxation and approximation techniques to obtain convex surrogates. Related art distributed solution methods may tap into the decomposability of the Lagrangian function associated with convex surrogates of the OPF, and utilize iterative primal-dual-type methods to decompose the solution of the OPF task across DERs, utility, and aggregators.

In the presence of (fast-)changing load, ambient, and network conditions, these related art OPF schemes may offer decision making capabilities that do not match the dynamics of distribution systems. That is, during the time required to collect data from all the nodes of the network (e.g., loads), solve the OPF, and subsequently dispatch setpoints, the underlying load, ambient, and network conditions may have already changed. In such case, the DER output powers may be consistently regulated around outdated setpoints, leading to suboptimal system operation and violation of relevant electrical limits. These issues motivate the development of online OPF strategies that leverage the opportunities for fast-feedback offered by power-electronics-interfaced DERs to ensure adaptability to fast-changing ambient and load conditions, while enabling the near real-time pursuit of solutions of AC OPF problems.

Related art efforts to solve these issues include continuous-time feedback controllers that seek Karush-Kuhn-Tucker conditions for economic dispatch optimality for bulk systems. A heuristic comprising continuous-time dual ascent and discrete-time reference-signal updates has also been proposed, wherein local stability of the resultant closed-loop system may also be established. More recently, modified automatic generation and frequency control methods that incorporate optimization objectives corresponding to DC OPF problems have been proposed for bulk power systems. Focusing on AC OPF models, related art online solution approaches include e.g., the heuristic based on saddle-point-flow method, the online OPF for distribution systems with a tree topology, and the distributed dual (sub)-gradient scheme developed for (un)balanced distribution systems. Overall, the convergence results in these related art systems hinge on a time scale separation where cost and constraints of the target OPF problem change slowly compared to the controller dynamics.

In contrast, distributed control techniques that enable DERs to track the solution fast-changing OPF targets, and systems and devices implementing such techniques, have been detailed herein. Stability and tracking capabilities have been analytically characterized in terms of bounds between the DER output powers and the optimal trajectory set forth by the time-varying OPF problem. In some examples, the distributed control techniques of the present disclosure may be broadened by considering more realistic scenarios where communication constraints lead to asynchronous and partial updates of the control signals. In some such examples, the disclosed control techniques may still be based on suitable linear approximations of the AC power-flow equations as well as Lagrangian regularization methods. However, OPF-target tracking capabilities are also provided herein for cases where: i) communication-packet losses lead to asynchronous updates of the control signals; and/or ii) DER setpoints are updated at a fast time scale based on local voltage measurements, and information on state of the remaining part of the network is utilized if and when available, based on communication constraints. These cases may be generally referred to herein as "communication constraints." The systems, devices, and methods addressing communication constraints, as described herein, may allow controllers to ensure that OPF constraints are tightly met, while relaxing the requirements on the supporting communication infrastructure.

For the communication constrained scenario, consider a power distribution network comprising N+1 nodes collected in the set $\mathcal{N} \cup \{0\}$, $\mathcal{N}:=\{1, \ldots, N\}$, and distribution lines represented by the set of edges $\epsilon:=\{(m, n)\} \subset \mathcal{N} \cup \{0\} \times \mathcal{N} \cup \{0\}$. Assume that the temporal domain is discretized as $t=k\tau$, where $k \in \mathbb{N}$ and $\tau>0$ is small enough to capture fast variations on loads and ambient conditions. Let $V_n^k \in \mathbb{C}$ and $I_n^k \in \mathbb{C}$ denote the phasors for the line-to-ground voltage and the current injected at node n over the kth instant, respectively, and define the N-dimensional complex vectors $v^k:=[V_1^k, \ldots, V_N^k]^T \in \mathbb{C}^N$ and $i^k:=[I_1^k, \ldots, I_N^k]^T \in \mathbb{C}^N$. Node 0 denotes the distribution transformer, and it is taken to be the slack bus. Using Ohm's and Kirchhoff's circuit laws, it follows that $i^k = V_0^k \bar{y}^k + Y^k v^k$, where $Y^k \in \mathbb{C}^{N \times N}$ and $\bar{y}^k \in \mathbb{C}^{N \times N}$ are formed based on the network topology and the $\pi$-equivalent circuit of the lines (see e.g., Kersting).

Inverter-interfaced DERs are assumed to be located at nodes $\mathcal{G} \subseteq \mathcal{N}$, $N_{\mathcal{G}}:=|\mathcal{G}|$. The real and reactive powers at the AC side of inverter $i \in \mathcal{G}$ at each time $k\tau$ are denoted as $P_i^k$ and $Q_i^k$, respectively, and are confined within the DER operating region $(P_i^k, Q_i^k) \in \mathcal{Y}_i^k$. The set $\mathcal{Y}_i^k$ captures hardware as well as operational constraints, and is assumed to be convex and compact. For example, for PV inverters, this set is given by $\mathcal{Y}_i^k := \{(P_i^k, Q_i^k): P_i^{min} \leq P_i^k \leq P_{av,i}^k, (Q_i^k)^2 \leq S_i^2 - (P_i^k)^2\}$, where $P_{av,i}^k$ denotes the real power available at time k and $S_i$ is the capacity of the inverter. For future developments, let $u_i^k := [P_i^k, Q_i^k]^T$ collect the real and reactive setpoints for DER i at time k, and define the set $\mathcal{Y}^k := \mathcal{Y}_1^k \times \ldots \mathcal{Y}_{N_{\mathcal{G}}}^k$. Finally, for each node i, let $P_{l,i}^k$ and $Q_{l,i}^k$ denote the real and reactive power demand, respectively, at time k.

To bypass challenges related to nonconvexity and NP-harness of the OPF task, and facilitate the design of low-complexity control implementable on devices such as microcontrollers that accompany power-electronics interfaces of inverters, these sections leverage suitable linear approximations of the AC power-flow equations. To this end, collect the voltage magnitudes $\{|V_i^k|\}_{i \in \mathcal{N}}$ in the vector $\rho^k := [|V_1^k|, \ldots, |V_N^k|]^T \in \mathbb{R}^N$. Then, given pertinent matrices $R^k, B^k, H^k, J^k \in \mathbb{R}^{N \times N}$ and vectors $b^k, a^k \in \mathbb{C}^N$, one can obtain approximate power-flow relations whereby voltages are linearly related to the injected real and reactive powers as $$v^k \approx H^k p^k + J^k q^k + b^k \tag{26a}$$

$$\rho^k \approx R^k p^k + B^k q^k + a^k, \tag{26b}$$

where $p_n^k = P_n^k - P_{l,n}^k$, $q_n^k = Q_n^k - Q_{l,n}^k$ if $n \in \mathcal{G}$ and $p_n^k = -P_{l,n}^k$, $q_n^k = -Q_{l,n}^k$ $n \in \mathcal{N} \backslash \mathcal{G}$. Matrices $R^k, B^k, H^k, J^k \in \mathbb{R}^{N \times N}$ and vectors $b^k, a^k \in \mathbb{C}^N$ can be obtained as described, e.g., in Dhople, and can be time-varying to reflect, for example, changes in the topology and voltage linearization points. Through (26a) and (26b), approximate linear relationships for power losses and power flows as a function of $(P_i^k, Q_i^k)_{i \in \mathcal{G}}$ can be readily derived.

Denote as $V^{min}$ and $V^{max}$ minimum and maximum, respectively, voltage service limits, and let the cost $\Sigma_{n \in \mathcal{G}} f_n^k(u_n^k)$ capture possibly time-varying DER-oriented objectives (e.g., cost of/reward for ancillary service provisioning or feed-in tariffs), and/or system-level performance metrics (e.g., power losses and/or deviations from the nominal voltage profile). With these definitions, and based on (26a) and (26b), an approximate rendition of the AC OPF problem can be formulated as:

$$(P1^k) \min_{\{u_i\}_{i \in \mathcal{G}}} \Sigma_{i \in \mathcal{G}} f_i^k(u_i) \tag{27a}$$

Subject to $$g_n^k(\{u_i\}_{i \in \mathcal{G}}) \leq 0, \forall n \in \mathcal{M} \tag{27b}$$

$$\bar{g}_n^k(\{u_i\}_{i \in \mathcal{G}}) \leq 0, \forall n \in \mathcal{M} \tag{27c}$$

$$u_i \in \mathcal{Y}_i^k, \forall i \in \mathcal{G} \tag{27d}$$

where $\mathcal{M} \subseteq \mathcal{N}$ is a set of nodes strategically selected to enforce voltage regulation throughout the feeder, $M := |\mathcal{M}|$, and $$g_n^k(\{u_i\}_{i \in \mathcal{G}}) := V^{min} - c_n^k - \sum_{i \in \mathcal{G}} [r_{n,i}^k(P_i - P_{\ell,i}^k) + b_{n,i}^k(Q_i - Q_{\ell,i}^k)] \tag{28a}$$

$$\bar{g}_n^k(\{u_i\}_{i \in \mathcal{G}}) := \sum_{i \in \mathcal{G}} [r_{n,i}^k(P_i - P_{\ell,i}^k) + b_{n,i}^k(Q_i - Q_{\ell,i}^k)] + c_n^k - V^{max}, \tag{28b}$$

with $c_n^k := a_n^k - \Sigma_{i \in \mathcal{N} \backslash \mathcal{G}}(r_{n,i}^k P_{l,i}^k + b_{n,i}^k Q_{l,i}^k)$. Regarding (27), the following assumptions may be made.

Assumption 6. Functions $f_i^k(u_i)$ are convex and continuously differentiable for each $i \in \mathcal{G}$ and $k \geq 0$. Define further the gradient map $f^k(u) := [\nabla_{u_1}^T f_1^k(u_1), \ldots \nabla_{u_{N_{\mathcal{G}}}}^T f_{N_{\mathcal{G}}}^k(u_{N_{\mathcal{G}}})]^T$. Then, it may be assumed that the gradient map $f^k: \mathbb{R}^{2N_{\mathcal{G}}} \to \mathbb{R}^{2N_{\mathcal{G}}}$ is Lipschitz continuous with constant L over $\mathcal{Y}^k$ for all $k \geq 0$.

Assumption 7. (Slater's condition). For all $k \geq 0$, there exist a set of feasible power injections $\{\hat{u}_i\}_{i \in \mathcal{G}} \in \mathcal{Y}^k$ such that $g_n^k(\{\hat{u}_i\}_{i \in \mathcal{G}}) < 0$ and $\bar{g}_n^k(\{\hat{u}_i\}_{i \in \mathcal{G}}) < 0$, for all $n \in \mathcal{M}$.

From the compactness of set $\mathcal{Y}^k$, and under Assumptions 6 and 7, problem (27) is convex and strong duality holds. Further, there exists an optimizer $\{u_i^{opt,k}\}_{i \in \mathcal{G}}$, $\forall k \geq 0$. For future developments, let $g^k(u) \in \mathbb{R}^M$ and $\bar{g}^k(u) \in \mathbb{R}^M$ be a vector stacking all functions $g_n^k(\{u_i\}_{i \in \mathcal{G}})$ and $\bar{g}_n^k(\{u_i\}_{i \in \mathcal{G}})$. Then, given that these functions are linear in u, it follows that there exists a constant G such $\|\nabla_u g^k(u)\|_2 \leq G$ and $\|\nabla_u \bar{g}^k(u)\|_2 \leq G$ for all $u \in \mathcal{Y}^k$ for all $k \geq 0$.

Problem ($P1^k$) represents a convex approximation of the AC OPF task. Constraints (27b) and (27c) are utilized to enforce voltage regulation, while (27d) models DER hardware constraints. The problem ($P1^k$) specifies OPF targets that corresponds to a specific time instant $k\tau$. Accordingly, in the presence of (fast-)changing load, ambient, and network conditions, repeated solutions of ($P1^k$) for $K \in \mathbb{N}$ would ideally produce optimal reference setpoint trajectories for the DER $\{u_n^{opt,k}, k \in \mathbb{N}\}$. However, related art centralized and distributed solution approaches may not be able to collect network data (e.g., loads), solve ($P1^k$), and subsequently dispatch setpoints within $\tau$ seconds, and may consistently regulate the power-outputs $(P_i^k, Q_i^k)_{i \in \mathcal{G}}$ around outdated setpoints. In contrast, the control techniques described herein may continuously regulate the DER output powers around points that one would have if ($P1^k$) could be solved instantaneously.

Let $y^k = \mathcal{F}(\{u_i^k\}_{i \in \mathcal{G}})$ represent an AC power-flow solution for given DER output powers $\{u_i^k\}_{n \in \mathcal{G}}$, with vector $y^k$ collecting relevant electrical quantities such as voltages and power flows (averaged over one AC cycle). Further, let $\mathcal{C}_i(\bullet, y^k)$ describe an update rule for the setpoints of DER i. Then, given the following closed loop-system $$u_i^k = \mathcal{C}_i(u_i^{k-1}, y^k), \forall i \in \mathcal{G} \tag{29a}$$

$$y^k = \mathcal{F}(\{u_i^k\}_{i \in \mathcal{G}}) \tag{29b}$$

the goal is to synthesize controllers $\{\mathcal{C}_i\{\cdot,\cdot\}\}_{i\in\mathcal{G}}$ so that the DER output powers $\{u_i^k\}_{i\in\mathcal{G}}$ are driven to the solution $\{u_i^{opt,k}\}_{i\in\mathcal{G}}$ of the (time-varying) OPF problem (P1$^k$).

The synthesis of the controllers addressing communication restraints leverages primal-dual methods applied to regularized Lagrangian functions. To this end, let $\gamma:=[\gamma_1,\ldots,\gamma_M]^T$ and $\mu:=[\mu_1,\ldots,\mu_M]^T$ collect the Lagrange multipliers associated with (27b) and (27c), respectively, and consider the following augmented Lagrangian function associated with (P1$^k$):

$$\mathcal{L}^k(u^k,\gamma,\mu) := \sum_{i\in\mathcal{G}} f_i^k(P_i,Q_i) + (P_i - P_{\ell,i}^k)(\check{r}_i^k)^T(\mu-\gamma) + \qquad (30)$$

$$(Q_i - Q_{\ell,i}^k)(\check{b}_i^k)^T(\mu-\gamma) + c^T(\mu-\gamma) + \gamma^T 1_m V^{min} -$$

$$\mu^T 1_m V^{max} + \frac{\nu}{2}\sum_{n\in\mathcal{G}}\|u_n^k\|_2^2 - \frac{\epsilon}{2}(\|\gamma\|_2^2 + \|\mu\|_2^2)$$

where $\check{r}_i^k:=[\{r_{j,i}^k\}_{j\in\mathcal{M}}]^T$ and $\check{b}_i^k:=[\{b_{j,i}^k\}_{j\in\mathcal{M}}]^T$ are M×1 vectors collecting the entries of $R^k$ and $B^k$ in the ith column and rows corresponding to nodes in $\mathcal{M}$, $c^k:=[\{c_j^k\}_{j\in\mathcal{M}}]^T$, and constants $\nu>0$ and $\epsilon>0$ appearing in the Tikhonov regulation terms are design parameters. Function (30) is strictly convex in the primal variables $u_k:=[u_1^k,\ldots,\mathbf{u}_{N_G}^k]^T$ and strictly concave in the dual variables $\downarrow,\mu$. The upshot of (30) is that gradient-based approaches can be applied to (30) to find an approximate solution to (P1$^k$) with improved convergence properties. Further, it allows one to drop the strict convexity assumption on the cost function $\{f_i^k(u_i)\}_{i\in\mathcal{G}}$ and to avoid averaging of primal and dual variables. Accordingly, the following saddle-point problem can be formed:

$$\max_{\lambda\in\mathbb{R}_+^M,\mu\in\mathbb{R}_+^M}\min_{u\in\mathcal{Y}^k}\mathcal{L}_{\nu,\epsilon}^k(u^k,\gamma,\mu) \qquad (31)$$

and denote as $u^{*,k}:=[u_1^{*,k},\ldots,\mathbf{u}_{N_G}^{*,k}]^T$, $\gamma^{*,k}$, $\mu^{*,k}$ the unique primal-dual optimizer of (30). In general, the solutions of (27) and the regularized saddle-point problem (31) are expected to be different; however, the discrepancy between $u_i^{opt,k}$ and $u_i^{*,k}$ can be bounded as in Lemma 3.2 of Koshal, whereas bounds of the constraint violation are substantiated in Lemma 3.3 of Koshal. These bounds are proportional to $\sqrt{\epsilon}$. Therefore, the smaller $\epsilon$, the smaller is the discrepancy between $u_n^{opt,k}$ and $u_n^{*,k}$.

To track the time-varying optimizers $z^{*,k}:=[(u^{*,k})^T, (\gamma^{*,k})^T, (\mu^{*,k})^T]^T$ of (31), the following online primal-dual gradient method may be used:

$$u_i^{k+1} = \text{proj}_{\mathcal{Y}_i}\{u_i^k - \alpha\nabla_{u_i}\mathcal{L}_{\nu,\epsilon}^k(u,\gamma,\mu)|_{u_i^k,\gamma^k,\mu^k}\} \qquad (32a)$$

$$\gamma_n^{k+1} = \text{pro}^{j_{\mathcal{D}_\gamma}}\{\gamma_n^k + \alpha(\underline{g}_n^k(\{u_i^k\}_{i\in\mathcal{G}}) - \epsilon\gamma_n^k)\} \qquad (32b)$$

$$\mu_n^{k+1} = \text{pro}^{j_{\mathcal{D}_\mu}}\{\mu_n^k + \alpha(\overline{g}_n^k(u_i^k\}_{i\in\mathcal{G}}) - \epsilon\mu_n^k)\}, \qquad (32c)$$

where $\alpha>0$ is the stepsize, $\text{pro}^{j_{\mathcal{Y}}}\{u\}$ denotes the projection of $u$ onto the convex set $\mathcal{Y}$, and $\mathcal{D}_\gamma$, $\mathcal{D}_\mu\subset\mathbb{R}^+$ are compact convex sets that can be chosen as explained in Koshal. Step (32a) is computed for each $i\in\mathcal{G}$, whereas (32b) and (32c) are performed for each note $n\in\mathcal{M}$. Convergence of the iterates $z^k:=[(u^k)^T, (\gamma^k)^T, (\mu^k)^T]^T$ to $z^{*,k}$ is established in Theorem 1 of Simonneto, and utilizes the following assumptions related to the temporal variability of (31).

Assumption 8. There exists a constant $\sigma_u \geq 0$ such that $\|u^{*,k+1} - u^{*,k}\| \leq \sigma_u$ for all $k\geq 0$.

Assumption 9. There exist constants $\sigma_{\underline{g}} \geq 0$ and $\sigma_{\overline{g}} \geq 0$ such that $|\underline{g}_n^{k+1}(u^{*,k+1}) - \underline{g}_n^k(u^{*,k})| \leq \sigma_{\underline{g}}$ and $|\overline{g}_n^{k+1}(u^{*,k+1}) - \overline{g}_n^k(u^{*,k})| \leq \sigma_{\overline{g}}$, respectively, for all $n\in\mathcal{N}$ and $k\geq 0$.

It can be shown that the conditions of Assumption 9 translate into bounds for the discrepancy between the optimal dual variables over two consecutive time instants. That is, $\|\gamma^{*,k+1} - \gamma^{*,k}\| \leq \sigma_\gamma$ and $\|\mu^{*,k+1} - \mu^{*,k}\| \leq \sigma_\mu$ with $\sigma\gamma$ and $\sigma\mu$ given by Prop. 1 of Simonetto. Upon defining $z^{*,k}:=[(u^{*,k})^T, (\gamma^{*,k})^T, (\mu^{*,k})^T]^T$ it also follows that $\|z^{*,k+1} - z^{*,k}\| \leq \sigma_z$ for a given $\sigma_z > 0$. Under Assumptions 6-9, convergence of (32) are investigated in Theorem 1 of Simonetto.

As further described below, the updates (32) may be modified to accommodate actional feedback from the distribution network system. This framework broadens the techniques described herein to address a more realistic scenario where communication constraints lead to asynchronous and/or partial updates of primal/dual variables.

Of note, i) given that $g^k(u)$ and $\overline{g}^k(u)$ are linear in $u$ and $\mathcal{Y}^k$ is compact, it follows that there exists a constant G such that $\|\nabla_u \underline{g}^k(u)\|_2 \leq G$ and $\|\nabla_u \overline{g}^k(u)\|_2 \leq G$ for all $k\geq 0$. Further, there exists constants $K>0$ and $\overline{K}$ such that $\|\underline{g}^k(u)\|_2 \leq K$ and $\|\overline{g}^k(u)\|_2 \leq \overline{K}$. Further, notice that $\|\gamma_i^k\|_2 \leq D_\gamma$ and $\|\mu_i^k\|_2 \leq D_\mu$ for given $D_\gamma, D_\mu > 0$ by construction (cf. (32b) and (32c)), and define the time-varying mapping $\Phi^k$ as $$\Phi^k:\{u^k,\gamma^k,\mu^k\}\mapsto\begin{bmatrix}\nabla_{u_1}\mathcal{L}_{\nu,\epsilon}^k(u,\gamma,\mu)|_{u_1^k,\gamma^k,\mu^k}\\\vdots\\\nabla_{u_{N_G}}\mathcal{L}_{\nu,\epsilon}^k(u,\gamma,\mu)|_{u_{N_G}^k,\gamma^k,\mu^k}\\-(\underline{g}_1^k(u^k) - \epsilon\gamma_1^k)\\\vdots\\-(\underline{g}_M^k(u^k) - \epsilon\gamma_M^k)\\-(\overline{g}_1^k(u^k) - \epsilon\mu_1^k)\\\vdots\\-(\overline{g}_M^k(u^k) - \epsilon\mu_M^k)\end{bmatrix}$$

Then, the following holds.

Lemma 2: The map $\Phi^k$ is strongly monotone with constant $\eta=\min\{\nu,\epsilon\}$, and Lipschitz over $\mathcal{Y}^k\times\mathcal{D}_\gamma\times\mathcal{D}_\mu$ with constant $L_{\nu,\epsilon} = \sqrt{(L+\nu+2G)^2 + 2(G+\epsilon)^2}$.

With regard to the distributed optimization scheme (32): (i) functions $\{\underline{g}_n^k(u^k)\}_{n\in\mathcal{M}}$ and $\{\overline{g}_n^k(u^k)\}_{n\in\mathcal{M}}$ substantiate the distance of the voltage magnitudes from the limits $V^{min}$ and $V_{max}$, respectively, of given setpoints $u^k$; (ii) to evaluate $\underline{g}_n^k(u^k), \overline{g}_n^k(u^k)$ at the current points $u^k$ it is necessary to collect all loads across the distribution network (cf. (28)); and (iii) all dual variables need to be collected at each DER $i\in\mathcal{G}$ in order to carry out step (32a).

To include actionable feedback from the system, the techniques described herein replace the algorithmic quantities $\{\underline{g}_n^k(u^k)\}_{n\in\mathcal{M}}$ and $\{\overline{g}_n^k(u^k)\}_{n\in\mathcal{M}}$ with actual voltage measurements. To this end, let $m_n^k$ denote a measurement of the voltage magnitude $|V_n^k|$ acquired at time $k$ from node $n\in\mathcal{M}$. Further, to account for communication errors in collecting the dual variables at each DER, let $\tilde{\gamma}_i^{l_i(k)}, \tilde{\mu}_i^{l_i(k)}$ represents copies of the most recent multipliers available at DER $i$, with $l_i(k)\in\mathbb{N}$ the index of the most recent successful communication. Accordingly, the control techniques addressing communication constraints, as described herein, amount to the following iterative operations:

[S1] Update power setpoints at each DER $i \in \mathcal{G}$ as:

$$u_i^{k+1} = \text{proj}_{\mathcal{Y}_i^k}\{u_i^k - \alpha \nabla_{u_i} \mathcal{L}_{\nu,\epsilon}^k(u,\gamma,\mu)|_{u_i^k,\tilde{\gamma}_i^{l_i(k)},\tilde{\mu}_i^{l_i(k)}}\} \quad (33a)$$

[S2] Collect voltage measurements $\{m_n^k\}_{n \in \mathcal{M}}$, updates dual variables as:

$$\gamma_n^{k+1} = \text{proj}_{\mathcal{D}_\gamma}\{\gamma_n^k + \alpha(V^{min} - m_n^k - \epsilon\gamma_n^k)\} \quad (33b)$$

$$\mu_n^{k+1} = \text{proj}_{\mathcal{D}_\mu}\{\mu_n^k + \alpha(m_n^k - V^{max} - \epsilon\mu_n^k)\} \quad (33c)$$

for all $n \in \mathcal{M}$, and broadcasts dual variables to DERs.

[S3] Each DER $i \in \mathcal{G}$ sets the local copies of the dual variables to $\tilde{\gamma}_i^k = \gamma^k$, $\tilde{\mu}_i^k = \mu^k$ if dual variables are received, and $\tilde{\gamma}_i^k = \gamma^{k-1}$, $\tilde{\mu}_i^k = \mu^{k-1}$ otherwise.

Go to [S1].

Figure 9A:
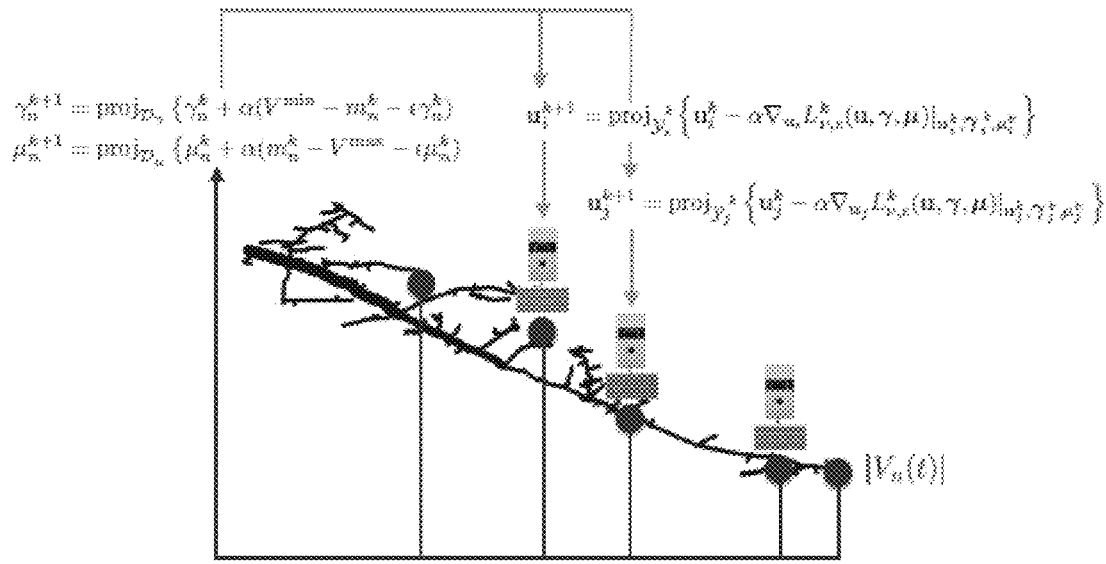
FIGS. 9A and 9B are conceptual diagrams illustrating an example power distribution network system configured to regulate voltage through gather and broadcast techniques under communication constraints, in accordance with one or more aspects of the present disclosure.

Steps [S1]-[S3] are illustrated in FIG. 9A. Differently from related art OPF schemes, (33) does not require knowledge of the loads at locations $\mathcal{N} \setminus \mathcal{G}$. The only information necessary for these control techniques pertains to the distribution line and network models, which are utilized to build the matrices in (26). The convergence properties of (33) are analyzed below.

Let $\xi_i^k := [\tilde{r}_i^k, \tilde{b}_i^k]^T$, and notice that $\|\xi_i^k\|_2 \leq X_i$ for all $k \geq 0$. Further, let $e_\gamma^k \in \mathbb{R}^M$ and $e_\mu^k \in \mathbb{R}^M$ collect the dual gradient errors $V^{min} - \psi_n^k - \epsilon\gamma_n^k - \nabla_{\gamma_n}\mathcal{L}_{\nu,\epsilon}^k$ and $\psi_n^k - V^{max} - \epsilon\mu_n^k - \nabla_{\mu_n}\mathcal{L}_{\nu,\epsilon}^k$, respectively, when actual voltage measurements are utilized instead of the true gradient of the regularized Lagrangian with respect to the dual variables. Then, the following practical assumptions may be made.

Assumption 10. There exist constants $e_d \geq 0$ such that $\max\{\|e_\gamma^k\|_2, \|e_\mu^k\|_2\} \leq e_d$ for all $k \geq 0$.

Assumption 11. For DER i, at most $M_i < +\infty$ consecutive communication packets are lost. That is, $\max\{k - l_i(k)\} \leq E_i$ for all k.

Under these assumptions, it can be shown that the update (38a) involves an inexact gradient step, as substantiated in the following lemma.

Lemma 3: When $E_i > 0$, one has that $$\nabla_{u_i} \mathcal{L}_{\nu,\epsilon}^k(u,\gamma,\mu)|_{u_i^k,\tilde{\gamma}_i^{l_i(k)},\tilde{\mu}_i^{l_i(k)}}$$

is an inexact gradient of the regularized Lagrangian $\mathcal{L}_{\nu,\epsilon}^k(u_i,\gamma,\mu)$ with respect to $u_i$ evaluated at $\{u_i^k, \gamma^k, \mu^k\}$, i.e., $$\nabla_{u_i} \mathcal{L}_{\nu,\epsilon}^k(u_i,\gamma,\mu)|_{u_i^k,\tilde{\gamma}_i^{l_i(k)},\tilde{\mu}_i^{l_i(k)}} = \nabla_{u_i} \mathcal{L}_{\nu,\epsilon}^k(u_i,\gamma,\mu)|_{u_i^k,\gamma^k,\mu^k + e_{u,i}^k},$$

with error bounded as:

$$\|e_{u,i}^k\|_2 \leq \alpha E_i X_i [K + \bar{K} + \epsilon(D_\gamma + D_\mu) + 2e_d]. \quad (34)$$

It follows that the overall error in the primal iterate $e_u^k := [(e_{u,1}^k)^T, \ldots, e_{u,N_g}^k]^T$ is bounded too. Particularly, $$\|e_u^k\|_2 \leq \alpha \left[\sum_{i \in \mathcal{G}} E_i^2 X_i^2 [K + \bar{K} + \epsilon(D_\gamma + D_\mu) + 2e_d]^2\right]^{\frac{1}{2}}. \quad (35)$$

Henceforth, denote as $e_u$ the right-hand side of (35), and notice that $e_u \geq e_d$ whenever $E_i > 0$ for all $i \in \mathcal{G}$. Convergence and tracking properties of the communication-constrained feedback control techniques (e.g., equations (33)) are established below.

Theorem 2: Consider the sequence $\{z^k\} := \{u^k, \gamma^k, \mu^k\}$ generated by (33). Let Assumptions 6-11 hold. For fixed positive scalars $\epsilon$, $\nu > 0$, if the stepsize $\alpha > 0$ is chosen such that $$\rho(\alpha) := \sqrt{1 - 2\eta\alpha + \alpha^2 L_{\nu,\epsilon}^2} 1, \quad (36)$$

that is $0 < \alpha < 2\eta/L_{\nu,\epsilon}^2$, then the sequence $\{z^k\}$ converges Q-linearly to $z^{*,k} := \{u^{*,k}, \gamma^{*,k}, \mu^{*,k}\}$ up to the asymptotic error bound given by:

$$\limsup_{k \to \infty} \|z^k - z^{*,ki}\|_2 = \frac{1}{1 - \rho(\alpha)}[\alpha e + \sigma_z] \quad (37)$$

where $e = \sqrt{e_u^2 + 2e_d^2}$.

Bound (37) can be obtained by following steps similar to Theorem 2 above. In spite of the error in the primal updates, (33) preserves the properties of a strongly monotone operator and leads to a contraction mapping for $\|z^k - z^{*,k}\|_2$ if (36) is satisfied. Equation (37) quantifies the maximum discrepancy between iterates $\{u^k, \gamma^k, \mu^k\}$ generated by the control techniques described herein and the (time-varying) minimizer problem of (31). From Lemma 3.2 of Koshal and by using the triangle inequality, a bound for the difference between $u^k$ and the solution of (27) can be obtained.

In some examples, a modified version of the described control techniques may be used to address the case where communication constraints introduce significant delays in the computation of steps (33). Particularly, (33) may be complemented by local updates of the DER setpoints based on measurements of voltages at the DER points of connection as described in the following.

[S1'] Update power setpoints at each DER $i \in \mathcal{G}$ as:

$$u_i^{k+1} = \text{proj}_{\mathcal{Y}_i^k}\{u_i^k - \alpha \nabla_{u_i} \mathcal{L}_{\nu,\epsilon}^k(u,\gamma,\mu)|_{u_i^k,\tilde{\gamma}_i^k,\tilde{\mu}_i^k}\} \quad (38a)$$

[S2'] Collect voltage measurements $\{m_n^k\}_{n \in \mathcal{M}}$, and update dual variables as:

$$\gamma_n^{k+1} = \text{proj}_{\mathcal{D}_\gamma}\{\gamma_n^k + \alpha(V^{min} - m_n^k - \epsilon\gamma_n^k)\} \quad (38b)$$

$$\mu_n^{k+1} = \text{proj}_{\mathcal{D}_\mu}\{\mu_n^k + \alpha(m_n^k - V^{max} - \epsilon\mu_n^k)\} \quad (38c)$$

for all $n \in \mathcal{M}$.

[S3'] At each DER $i \in \mathcal{G}$, update the local copies of the dual variables as:

If $\gamma^k$ and $\mu^k$ are available and are received, set $\tilde{\gamma}_i^k = \gamma^k$, $\tilde{\mu}_i^k = \mu^k$;

If $\gamma^k$ and $\mu^k$ are not available, measure the voltage magnitude $\|V_i^k\|$ at the point of connection and update the ith entry of $\tilde{\gamma}_i^k$ and $\tilde{\mu}_i^k$ as $$\tilde{\gamma}_{i,i}^{k+1} = \text{proj}_{\mathcal{D}_\gamma}\{\bar{\gamma}_{i,i}^k + \alpha(V^{min} - m_i^k - \epsilon\tilde{\gamma}_{i,i}^k)\} \quad (38d)$$

$$\tilde{\mu}_{i,i}^{k+1} = \text{proj}_{\mathcal{D}_\mu}\{\bar{\mu}_{i,i}^k + \alpha(m_i^k - V^{max} - \epsilon\bar{\mu}_{i,i}^k)\} \quad (38e)$$

The remaining entries are not updated. That is, $\tilde{\gamma}_{i,j}^{k+1} = \tilde{\gamma}_{i,j}^k$ and $\tilde{\mu}_{i,j}^{k+1} = \tilde{\mu}_{i,j}^k$ for all $j \in \mathcal{M} \setminus \{i\}$.

Go to [S1'].

Figure 11A:
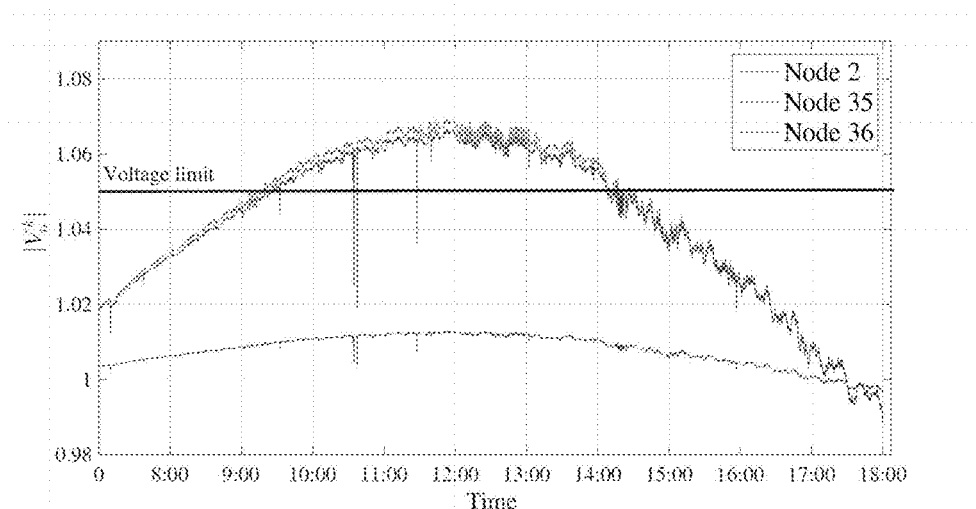
FIGS. 11A-11C are graphical plots illustrating voltage values of various nodes in the test network of FIG. 10, in accordance with one or more aspects of the present disclosure.
Figure 11B:
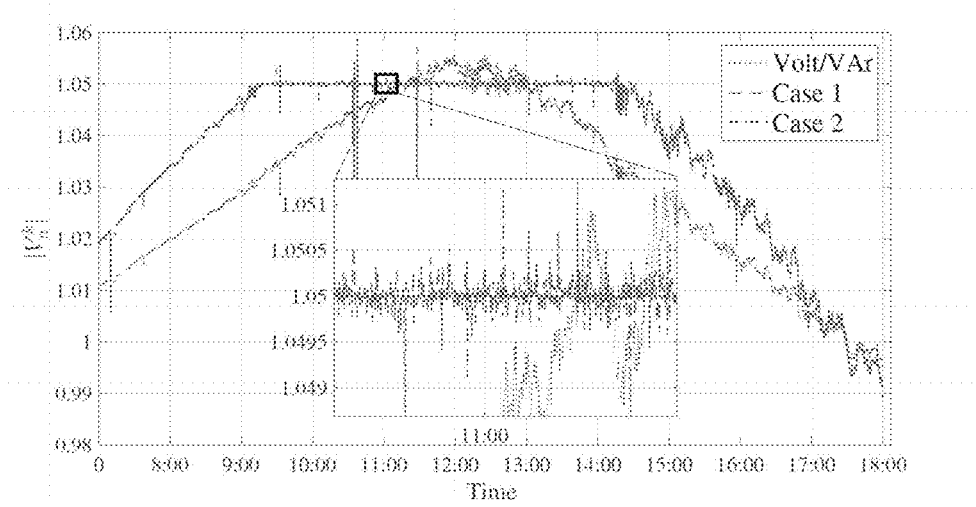

As shown in FIGS. 11A and 11B, operations [S1']-[S3'] may allow each DER inverter i to update the setpoints $u_i^k$ at a faster time scale, based on local measurements of the voltage level at the DER point on interconnection. At each time step, DER i continuously updates the ith entry of $\tilde{\gamma}_i^k$ and $\tilde{\mu}_i^k$ computers the setpoints $u_i^k$. The remaining entries of $\tilde{\gamma}_i^k$ and $\tilde{\mu}_i^k$ are updated when vectors $y^k$ and $\mu^k$ become available. Operations [S1']-[S3'] address the case where, for instance, an aggregator collects voltage measurements and broadcasts the updated version of the dual variables. These communication-constrained control techniques may be suitably modified to account for the case where each DER receives measurements of the voltage across nodes $n \in \mathcal{M}$ and updates the local copies of the dual variables based on $\{m_n^k\}_{n \in \mathcal{M}}$. This scenario leads to an operational setup where at each time k the DER updates the entries of $\tilde{\gamma}_i^k$ and $\tilde{\mu}_i^k$ that correspond to the subset of nodes from which voltage measurements are received.

The results of Lemma 3 and Theorem 2 can be adapted to [S1']-[S3']. In this case, $M_i$ represents the number of iterations that are necessary for DER i to update all the entries of dual variables (or to receive measurements of all voltages in $\mathcal{M}$).

Figure 10:
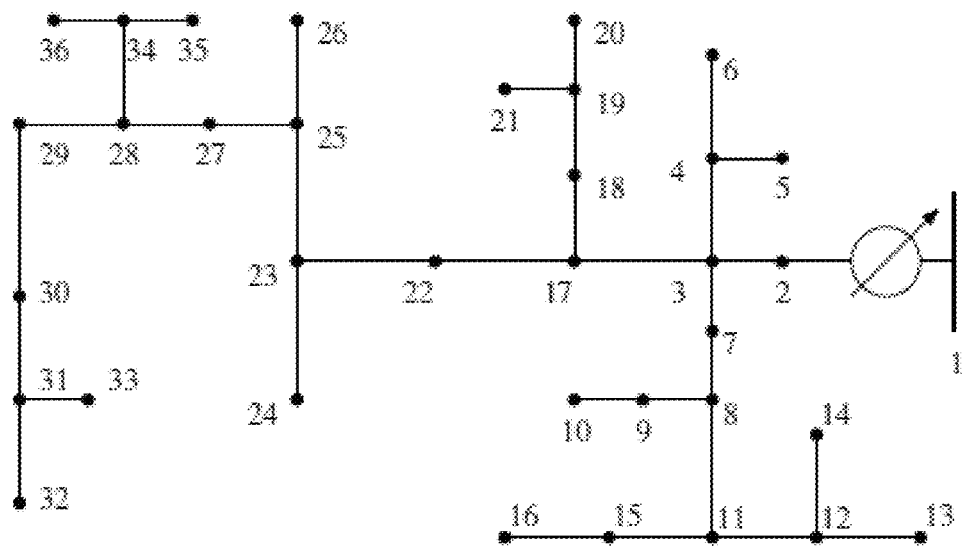
FIG. 10 is a diagram illustrating the IEEE 37-node power distribution test network.

Consider a modified version of the IEEE 37-node test feeder shown in FIG. 10. The modified network is obtained by considering a single-phase equivalent, and by replacing the loads specified in the original dataset with real load data measured from feeders in Anatolia, Calif. during the week of August 2012. Particularly, the data have a granularity of 1 second, and represent the loading of secondary transformers. Line impedances, shunt admittances, as well as active and reactive loads are adopted from the respective dataset. With reference to FIG. 10, it is assumed that photovoltaic (PV) systems are located at nodes 4, 7, 10, 13, 17, 20, 22, 23, 26, 28, 29, 30, 31, 32, 33, 34, 35, and 36, and their generation profile is simulated based on the real solar irradiance data available in Bank. Solar irradiance data have a granularity of 1 second. The rating of these inverters are 300 kVA for i=3, 350 kVA for i=15; 16, and 200 kVA for the remaining PV inverters.

The example of FIG. 10 demonstrates how the control techniques described herein can reliably prevent overvoltages that are likely to be experienced during periods when PV generation exceeds the demand. The minimum and maximum voltage limits are set to 0:95 pu and 1:05 pu, respectively. With this simulation setup, when no actions are taken to prevent overvoltages, one would have voltages well beyond 1:05 pu at nodes 29-36, with the most severe overvoltage conditions experiences at node 35. The voltage profile is provided in FIG. 11A.

The target optimization objective (27a) is set to $\theta_n^k (u_n^k) = c_q(Q_n^k)^2 + c_p(P_{av,n}^k - P_n^k)^2$ to minimize the amount of real power curtailed from the PV systems and to minimize the amount of reactive power injected or absorbed. The coefficients may be set to $c_p = 3$ and $c_q = 1$ for all PV systems. It is assumed that the dual ascent operation is performed at the utility/aggregator, which subsequently broadcasts the dual variables to DER systems. The controller parameters are set as $\nu = 10^{-3}$, $\epsilon = 10^{-4}$, and $\alpha = 0.2$. The stepsize $\alpha$ was selected experimentally, in this example.

The following provide two example cases:

Case 1: Control techniques [S1]-[S3] are implemented, and the primal-dual updates represented in FIG. 9A are repeated every 1 second.

Figure 9B:
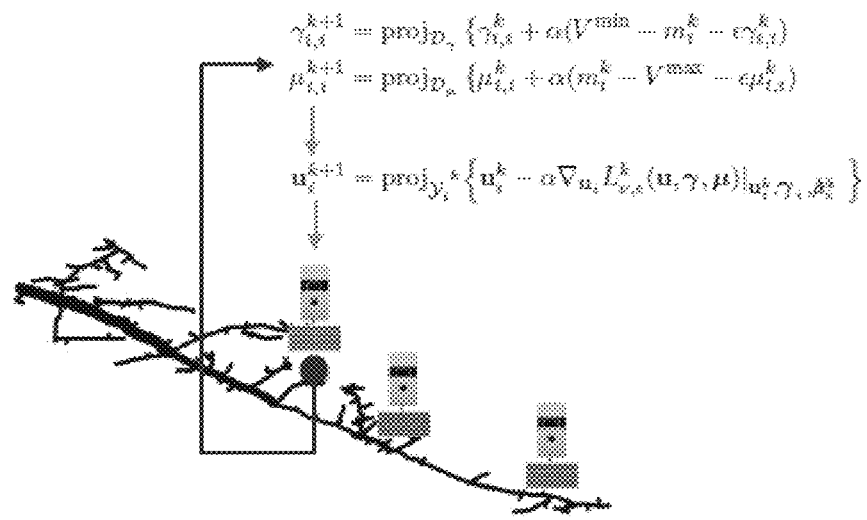

Case 2: Communication constrained control techniques [S1']-[S3'] are implemented, where the global operations represented in FIG. 9A are repeated every 1 second, and are complemented by the local operations (38a) and (38d) and (38e). The operations represented in FIG. 9B are performed every 0.1 seconds. This way, $E_i$ turns out to be $E_i = 9$ for all $i \in \mathcal{G}$.

In Case 2, the PV system setpoints are updated at a faster time scale by utilizing local voltage measurements (cf. FIG. 9B); voltage across the network are collected every 1 s, and are utilized to update the all the entries of the dual variables (cf. FIG. 9A). The performance of the control techniques described herein is compared with local Volt/VAr control, a related art control strategy. Particularly, a droop control without deadband is considered, where inverters set $Q_n^k = 0$ when $|V_n^k| = 1$ pu and linearly increase the reactive power to $Q_n^k = -\sqrt{S_n^2 - (P_{av,n}^t)^2}$ when $|V_n^k| \geq 1.05$ pu. The PV-inverters measure the voltage magnitude and update the reactive setpoint every 0.1 seconds.

FIG. 11B illustrates the voltage profile obtained at node 35 using the control techniques of the present disclosure as well as local Volt/VAr control. First, it can be seen that Volt/VAr control fails in resolving overvoltage conditions in the considered setup. In contrast, the control techniques described herein ensure that voltage limits are satisfied. However, it can be clearly seen that the control techniques in Case 2 yield a smoother voltage profile, and this may bring higher power-quality guarantees at both the customer and utility sides.

Figure 11C:
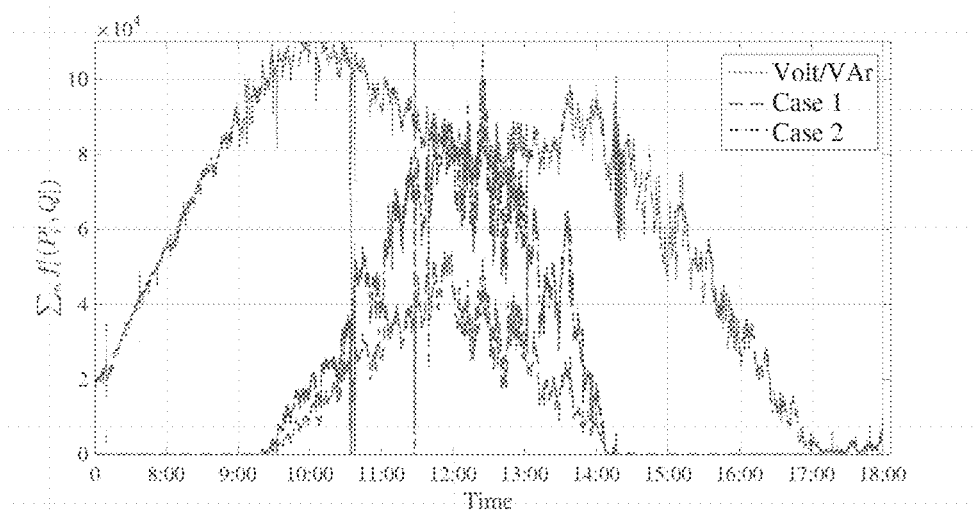

FIG. 11C reports the cost achieved by the control techniques described herein. That is, $\Sigma_{n \in \mathcal{G}} c_q(Q_n^k)^2 + c_p(P_{av,n}^k - P_n^k)^2$, for all k. This is compared with the cost of reactive power provisioning incurred by Volt/VAr control, which is computed as $\Sigma_{n \in \mathcal{G}} c_q(Q_n^k)^2$, for all k. The advantages of the described control techniques are evident, as they enable voltage regulation at a lower cost. This is likely still useful to obtain an improved voltage profile despite the higher cost of ancillary service provisioning seen in Case 2.

Proof of Lemma 3: Define $\zeta_i^{k,k-i} := \nabla_{u_i} \mathcal{L}_{\nu,\epsilon}^k (u,\gamma,\mu)|_{u_i^k, \gamma^{k-i}, \mu^{k-i}}$, which is given by $$\zeta_i^{k,k-i} = \nabla_{u_i}[f_1^k(u_1), \ldots, f_G^k(u_G)]^T|_{u_i^k} + \xi_i^k(\mu^{k-i} - \gamma^{k-i}) + \nu u_i^k. \tag{39}$$

Recall that $\|\gamma_i^k\|_2 \leq D_\gamma$ and $\|\mu_i^k\|_2 \leq D_\mu$, for all $k \geq 0$, and notice that the norm of the vector $\xi_i^k = [\tilde{r}_i^k, b_i^k]^T$ can be bounded as $\|\xi_i^k\|_2 \leq X_i$ for all $k \geq 0$. Next, notice that $\zeta_i^{k,k-M}$ can be written as $$\zeta_i^{k,k-M} = \zeta_i^{k,k} + \sum_{j=1}^{M_i}(\zeta_i^{k,k-j} - \zeta_i^{k,k-j+1}). \tag{40}$$

where $e_{u,i}^k = \Sigma_{j=1}^{E_i}(\zeta_i^{k,k-j} - \zeta_i^{k,k-j+1})$. Expanding on (40), one obtains that $e_{u,i}^k = \xi_i^k \Sigma_{j=1}^{E_i}[(\mu_i^{k-j} - \mu_i^{k-j+1}) + (\gamma_i^{k-j+1} - \gamma_i^{k-j})]$. Then, using the triangle inequality, one has that $\|e_{u,i}^k\|_2 \leq X_i \Sigma_{j=1}^{E_i}[\|\mu^{k-j} - \mu^{k-j+1}\|_2 + \|\gamma^{k-j+1} - \gamma^{k-j}\|_2]$. Next, $\|\mu^{k-j} - \mu^{k-j+1}\|_2$ can be bounded as:

$$\|\mu^{k-i} - \mu^{k-i+1}\|_2 = \|\mu^{k-i} - \text{proj}_{D_\mu}\{\mu_n^{k-i} + \alpha(m^k - 1V^{max} - \epsilon\mu^{k-i})\}\|_2 \tag{41a}$$

$$= \|\mu^{k-i} - \text{proj}_{D_\mu}\{\mu_n^{k-i} + \alpha(\bar{g}^{k-i}(u^k) + e_\mu^{k-i} - \epsilon\mu^{k-i})\}\|_2 \tag{41b}$$

$$\leq \|\alpha(\bar{g}^{k-i}(u^k) + e_\mu^{k-i} - \epsilon\mu^{k-i})\|_2 \tag{41c}$$

$$\leq \alpha(\|\bar{g}^{k-i}(u^k)\|_2 + \|e_\mu^{k-i}\|_2 + \epsilon\|\mu^{k-i}\|_2) \tag{41d}$$

$$\leq \alpha(\bar{K} + e_d + \epsilon D_\mu) \tag{41e}$$

where $m^k$ in (41a) collects all the voltage measurements $m^k := [m_1^k, \ldots, m_M^k]^T$, and the non-expansive property of the projection operator, along with the fact that $\mu^j = \text{proj}_{D_\mu}\{\mu^j\}$, is utilized to derive (41c). Using (41c), it follows that $\Sigma_{j=1}^{M_i} \|\mu^{k-j} - \mu^{k-j+1}\|_2 \leq \alpha M_i (\bar{K} + e_d + \epsilon D_\mu)$. Following similar steps, one can show that $\Sigma_{j=1}^{M_i} \|\gamma^{k-j} - \gamma^{k-j+1}\|_2 \leq \alpha E_i (K + e_d + \epsilon D_\gamma)$. Bound (34) readily follows.

The techniques described herein provide methods, devices, and systems for gather and broadcast control that seek DER setpoints corresponding to AC OPF solutions. The tracking capabilities of the control techniques described herein may be used in reliable (i.e., unconstrained) systems, as well as in systems working under communication constraints, such as packet loss and partial updates of control signals.

Figure 12:
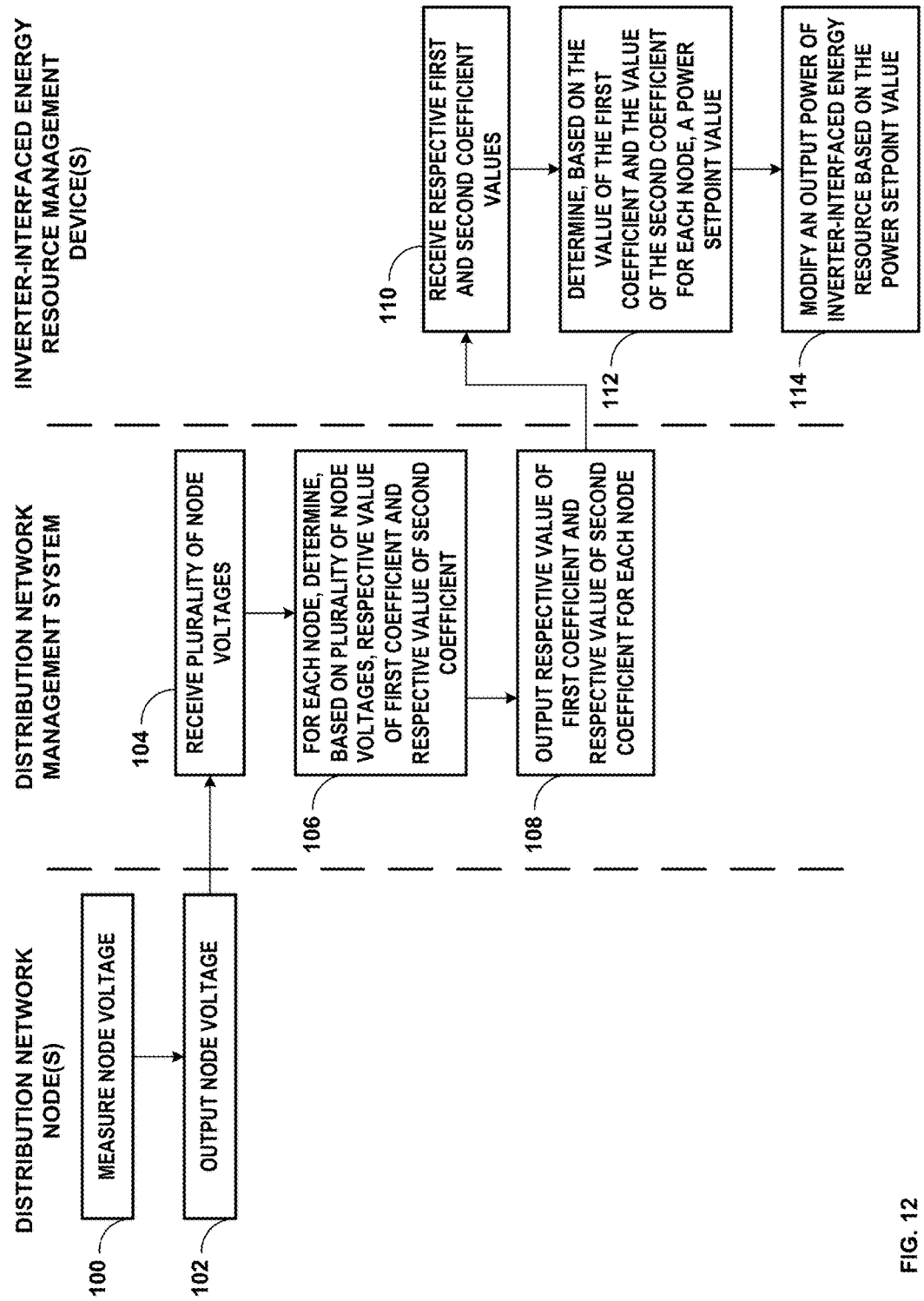
FIG. 12 is a flow diagram illustrating example operations for regulating voltage through gather and broadcast techniques, in accordance with one or more aspects of the present disclosure.

FIG. 12 is a flow diagram illustrating example operations for regulating voltage through gather and broadcast techniques, in accordance with one or more aspects of the present disclosure. FIG. 12 represents only one example process for regulating voltage through the gather and broadcast techniques described herein, and various other or additional operations may be used in other examples. The example operations of FIG. 12 are described below within the context of FIG. 2.

In the example of FIG. 12, one or more nodes of a distribution network may be configured to measure a node voltage (100). For example, each of nodes 6 may determine a respective voltage measurement that corresponds to the node. That is, in some examples, each of nodes 6 may be (or include) voltage measurement devices that are capable of measuring the voltage at the respective node. In some examples, one or more of inverters 10 and/or distribution network management system 4 may additionally or alternatively be configured to measure voltage at their respective locations.

The distribution network nodes, in the example of FIG. 12, may each output the measured node voltage (102). For instance, each of nodes 6 may transmit its respective voltage measurement to a distribution network management system via one or more wired or wireless communication networks. In other examples, nodes 6 may additionally or alternatively transmit the voltage measurements to one or more other components within system 2, such as to one or more of inverters 10, to one another, or to other components not shown in FIG. 2.

In the example of FIG. 12, a distribution network management system may receive the plurality of node voltages (104). Distribution network management system 4, for instance, may receive voltage measurements 12.

For each node, the distribution network management system may determine, based on the plurality of node voltages, a respective value of a first voltage-constraint coefficient and a respective value of a second voltage-constraint coefficient (106). For instance, distribution network management system 4 may determine, for each of nodes 6 (and possibly other locations), a respective value of the first voltage-constraint coefficient based on a respective previous value of the first voltage-constraint coefficient, a respective minimum voltage value for the respective node, and the respective voltage measurement for the node. Distribution network management system 4 may determine a respective value of the second voltage-constraint coefficient based on a respective previous value for the second voltage-constraint coefficient, a respective maximum voltage value for the respective node, and the respective voltage measurement. In some examples, distribution network management system 4 may determine the respective values of the first and second voltage-constraint coefficients based additionally or alternatively on other criteria.

In the example of FIG. 12, the distribution network management system may output the respective value of the first voltage-constraint coefficient and the respective value of the second voltage-constraint coefficient for each node (108). For instance, distribution network management system 4 may output coefficient values 14 via one or more wired or wireless communication networks.

In the example of FIG. 12, one or more inverter-interfaced energy resource management devices may receive the respective first and second voltage-constraint coefficient values (110). Based on the value of the first voltage-constraint coefficient and the value of the second voltage-constraint coefficient for each node, the one or more inverter-interfaced energy resource management devices may determine a power setpoint value (112). For example, one or more of inverters 10 may receive coefficient values 14 and determine a power setpoint value for a respective one of energy resources 8 based on the coefficient values. In some examples, inverters 10 may determine the power setpoint value based additionally or alternatively on other criteria, such as one or more performance metrics. The performance metrics may be defined by a manager and/or owner of the corresponding energy resource and/or by a manager/operator of the power distribution network. Examples of performance metrics include a metric indicating cost for ancillary service provisioning, a metric indicating feed-in tariffs, and other metrics.

Based on the power setpoint value, the one or more inverter-interfaced energy resource management devices may, in the example of FIG. 12, modify an output power of an associated inverter-interfaced energy resource (114). For example, inverters 10 may modify output powers of energy resources 8. In various examples, modifying the output power may represent modifying a real output power, a reactive output power, or both.

The example operations of FIG. 12 may be performed in an iterative fashion. That is, while only a single flow is shown, each of operations 100, 102, 104, 106, 108, 110, 112, and/or 114 may be performed any number of times. In some examples, the operations may be performed periodically. In some such examples, the frequency with which these operations are performed may be the same. In other such examples, one or more of the operations may be performed with higher or lower frequency than other operations.

Additionally, while shown in the example of FIG. 12 as being performed by specific components, operations 100, 102, 104, 106, 108, 110, 112, and/or 114 may, in other examples, be performed by components other than those indicated. For instance, in some examples operations 104, 106, 112, and 114 may all be performed by the distribution network management system. An additional variation of the techniques described herein is described below with respect to FIG. 13.

Figure 13:
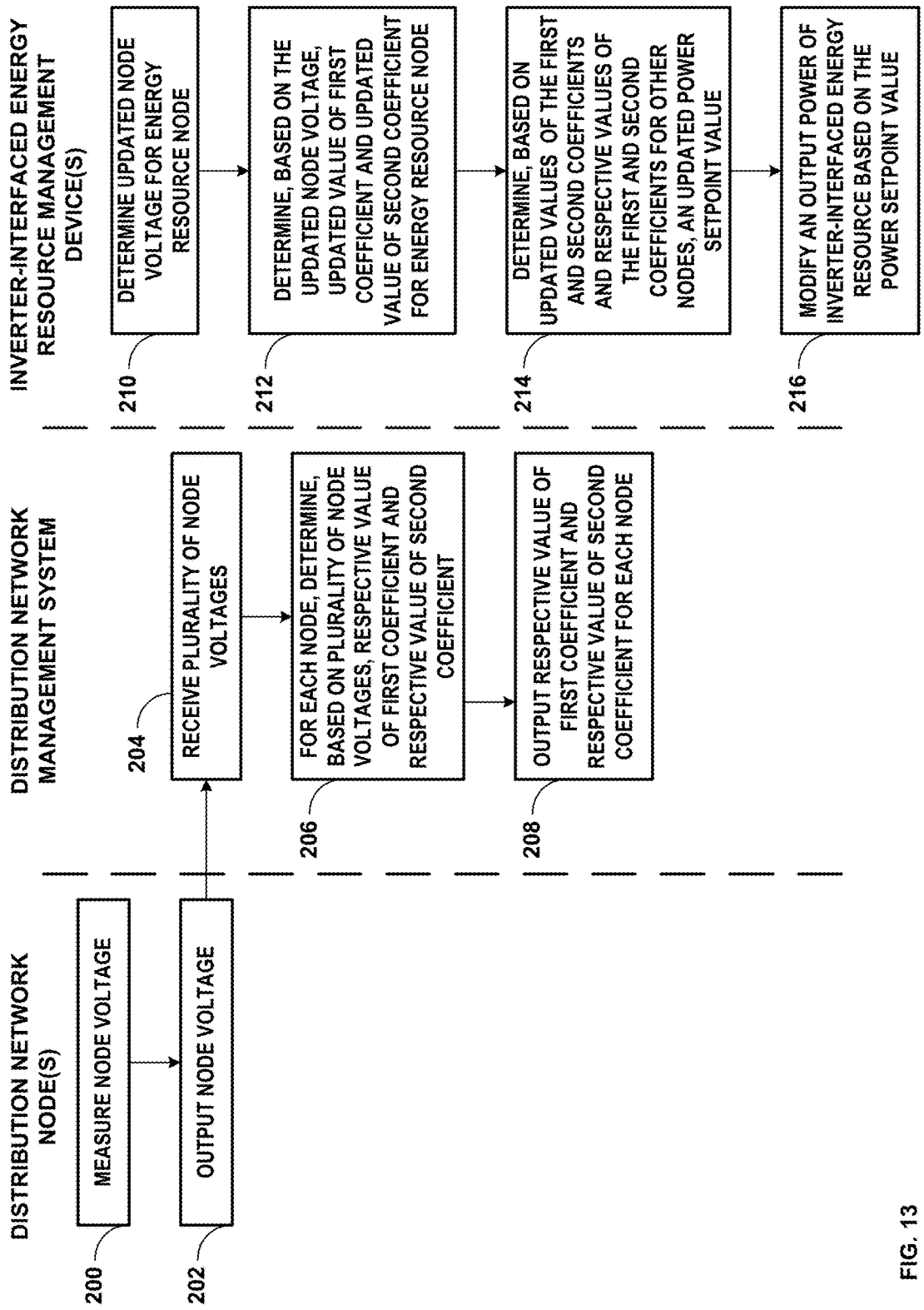
FIG. 13 is a flow diagram illustrating example operations for regulating voltage through gather and broadcast techniques under communication constraints, in accordance with one or more aspects of the present disclosure.

FIG. 13 is a flow diagram illustrating example operations for regulating voltage through gather and broadcast techniques under communication constraints, in accordance with one or more aspects of the present disclosure. FIG. 13 represents only one example process for regulating voltage while under communication constraints, through the gather and broadcast techniques described herein, and various other or additional operations may be used in other examples. The example operations of FIG. 13 are described below within the context of FIGS. 2 and 12.

In the example of FIG. 13, operations 200, 202, 204, 206, and 208 may be substantially the same as operations 100, 102, 104, 106, and 108 of FIG. 12, respectively. In the example of FIG. 13, however, the one or more inverter-interfaced energy resource management devices may not receive the respective value of the first voltage-constraint coefficient and respective value of the second voltage-constraint coefficient for each node outputted by the distribution network management system. As described herein, this may, in some examples, be the result of communications constraints. In some examples, this may be the result of the inverter-interfaced energy resource management devices performing operations at a higher frequency than the distribution network management system. For instance, an inverter-interfaced energy resource management device may be configured to determine power setpoint values every 0.1 seconds while distribution network management system may be configured to determine respective first and second voltage-constraint coefficients every 1.0 seconds.

In the example of FIG. 13, responsive to determining that they have not received the respective value of the first and second voltage-constraint coefficient for each node in a threshold amount of time, the inverter-interfaced energy resource management devices may determine an updated node voltage for the node that corresponds to the location at which the energy resource is coupled to the distribution network (210). For instance, inverter 10B may determine an updated value of the respective voltage measurement for node 6B.

The inverter-interfaced energy resource management devices, in the example of FIG. 13, may determine updated values of the first and second voltage-constraint coefficients for the node that corresponds to the location at which the energy resource is coupled to the distribution network (212). For instance, inverter 10B may update a portion of a previously received version of coefficient values 14 that corresponds to node 6B.

In the example of FIG. 13, the inverter-interfaced energy resource management devices may determine, based on the updated values of the first and second voltage-constraint coefficients, as well as the (non-updated) values of the first and second voltage-constraint coefficients for all other nodes, an updated power setpoint value (214). Based on the updated power setpoint value, the inverter-interfaced energy resource management devices may modify the output power of an associated inverter-interfaced energy resource (216). For example, inverter 10B may update the power output of energy resource 8B. In this way, the updated power setpoint value may serve as an "in-between" value that allows the inverter-interfaced energy resource management device to update the power as best it can without knowing the updated first and second voltage-constraint coefficients for all nodes in the distribution network.

The example operations of FIG. 13 may be performed in an iterative fashion. That is, while only a single flow is shown, each of operations 200, 202, 204, 206, 208, 210, 212, 214 and/or 216 may be performed any number of times. In some examples, the operations performed by the inverter-interfaced energy resource management device may not always be performed. For instance, in some iterations, the inverter-interfaced energy resource management device may perform operations 210, 212, 214, and 216 of FIG. 13 and in other iterations it may perform operations 110, 112, and 114 of FIG. 12. In this way, inverter-interfaced energy resource management devices may perform more accurate management of energy resource power outputs when all current information is available but, if some information is unavailable (e.g., due to communication constraints and/or differing update frequencies), the devices may continue to update power output using information that is available. Additionally, while shown in the example of FIG. 13 as being performed by specific components, operations 200, 202, 204, 206, 208, 210, 212, 214 and/or 216 may, in other examples, be performed by components other than those indicated.

The techniques of the present disclosure may additionally be described by the following examples.

EXAMPLE 1

A device including: at least one processor configured to: receive a plurality of voltage measurements, wherein voltage measurements in the plurality of voltage measurements correspond to respective nodes in a plurality of nodes of a distribution network; determine, for each respective node in the plurality of nodes: a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node; and a respective value of a second voltage-constraint coefficient based on a respective previous value of the second voltage-constraint coefficient, a respective maximum voltage value for the respective node, and the respective voltage measurement; and cause at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

EXAMPLE 2

The device of example 1, wherein the at least one processor is configured to cause the at least one inverter-interfaced energy resource to modify the output power by outputting, to the at least one inverter-interfaced energy resource, the respective value of the first voltage-constraint coefficient for each respective node and the respective value of the second voltage-constraint coefficient for each respective node.

EXAMPLE 3

The device of example 1, wherein: the at least one processor is configured to determine the respective value of the first voltage-constraint coefficient by: determining, based on the respective previous value of the first voltage-constraint coefficient, the respective minimum voltage value for the respective node, and the respective voltage measurement, a respective first coefficient offset value; scaling the respective first coefficient offset value by a step size to determine a respective scaled first coefficient offset value; responsive to determining that a respective first sum of the respective previous value of the first voltage-constraint coefficient and the respective scaled first coefficient offset value is greater than zero, setting the respective value of the first voltage-constraint coefficient to be the respective first sum; and responsive to determining that the respective first sum is less than or equal to zero, setting the respective value of the first voltage-constraint coefficient to be zero, and the at least one processor is configured to determine the respective value of the second voltage-constraint coefficient by: determining, based on the respective previous value of the second voltage-constraint coefficient, the respective maximum voltage value for the respective node, and the respective voltage measurement, a respective second coefficient offset value; scaling the respective second coefficient offset value by the step size to determine a respective scaled second coefficient offset value; responsive to determining that a respective second sum of the respective previous value of the second voltage-constraint coefficient and the respective scaled second coefficient offset value is greater than zero, setting the respective value of the second voltage-constraint coefficient to be the respective second sum; and responsive to determining that the respective second sum is less than or equal to zero, setting the respective value of the second voltage-constraint coefficient to be zero.

EXAMPLE 4

The device of example 3, wherein: the at least one processor is configured to determine the respective first coefficient offset value by: determining a respective first difference value that represents a difference between the respective minimum voltage value and the respective voltage measurement; and determining, as the respective first coefficient offset value, a difference between the respective first difference value and a version of the respective previous value of the first voltage-constraint coefficient that is scaled by a utility-defined parameter, and the at least one processor is configured to determine the respective second coefficient offset value by: determining a respective second difference value that represents a difference between the respective voltage measurement and the respective maximum voltage value; and determining, as the respective second coefficient offset value, a difference between the respective third difference value and a version of the respective previous value of the second voltage-constraint coefficient that is scaled by the utility-defined parameter.

EXAMPLE 5

The device of example 1, wherein: the at least one processor is configured to determine the respective value of the first voltage-constraint coefficient by calculating pro$_{\mathbb{R}_+}\{\gamma_n^k+\alpha(V^{min}-\psi_n^k-\epsilon\gamma_n^k)\}$, wherein: $\gamma_n^k$ represents the respective previous value of the first voltage-constraint coefficient, $V^{min}$ represents the respective minimum voltage value for the respective node, $\psi_n^k$ represents the respective voltage measurement, $\alpha$ represents a step size, and $\epsilon$ represents a predetermined parameter indicating an importance of previous voltage-constraint coefficient values, and the at least one processor is configured to determine the respective value of the second voltage-constraint coefficient by calculating pro$_{\mathbb{R}_+}\{\mu_n^k+\alpha(\psi_n^k-V^{max}-\epsilon\mu_n^k)\}$, wherein: $\mu_n^k$ represents the respective previous value of the second voltage-constraint coefficient, and $V^{max}$ represents the respective maximum voltage value for the respective node.

EXAMPLE 6

The device of example 1, wherein the at least one processor is configured to cause the at least one inverter-interfaced energy resource to modify the output power by: determining, for the at least one inverter-interfaced energy resource, a respective power setpoint value, based on the respective value of the first voltage-constraint coefficient for each respective node, the respective value of the second voltage-constraint coefficient for each respective node, and a respective previous power setpoint value, and causing the at least one inverter-interfaced energy resource to modify the output power based on the respective power setpoint.

EXAMPLE 7

The device of example 6, wherein the device comprises a power distribution network management system.

EXAMPLE 8

The device of example 6, wherein the device comprises a respective power inverter communicatively coupled to the at least one inverter-interfaced energy resource.

EXAMPLE 9

A system including: a plurality of voltage measurement devices, each configured to: determine a respective voltage measurement that corresponds to a respective node in a plurality of nodes of a distribution network; and output the respective voltage measurement; a distribution network management system configured to: receive, from each of the plurality of voltage measurement devices, the respective voltage measurement; determine, for each respective node in the plurality of nodes: a respective value of a first voltage-constraint coefficient, based on a respective previous value of the first voltage-constraint coefficient, a respective minimum voltage value for the respective node, and the respective voltage measurement; and a respective value of a second voltage-constraint coefficient based on a respective previous value of the second voltage-constraint coefficient, a respective maximum voltage value for the respective node, and the respective voltage measurement; and output the respective value of the first voltage-constraint coefficient for each respective node and the respective value of the second voltage-constraint coefficient for each respective node; and a plurality of inverter-interfaced energy resource management devices corresponding to a plurality of inverter-interfaced energy resources that are connected to the distribution network, each inverter-interfaced energy resource management device being configured to: receive the respective value of the first voltage-constraint coefficient for each respective node and the respective value of the second voltage-constraint coefficient for each respective node; determine, based on the respective value of the first voltage-constraint coefficient for each respective node and the respective value of the second voltage-constraint coefficient for each respective node, a respective power setpoint value; and modify a respective output power of a respective inverter-interfaced energy resource from the plurality of inverter-interfaced energy resources, based on the respective power setpoint value.

EXAMPLE 10

The system of example 9, wherein at least one of the plurality of inverter-interfaced energy resource management devices is a power inverter that couples a respective energy resource to the distribution network.

EXAMPLE 11

The system of example 9, wherein at least one of the plurality of inverter-interfaced energy resource management devices is a computing device communicatively coupled to a power inverter that couples a respective energy resource to the distribution network.

EXAMPLE 12

The system of example 9, wherein: at least one of the plurality of inverter-interfaced energy resource management devices is further configured to: determine an updated value of the respective voltage measurement that corresponds to a resource node, the resource node being the respective node at which the respective inverter-interfaced energy resource is connected to the distribution network; determine, based on the respective value of the first voltage-constraint coefficient for the resource node, the respective minimum voltage value for the resource node, and the updated value of the respective voltage measurement, an updated value of the first voltage-constraint coefficient for the resource node; determine, based on the respective value of the second voltage-constraint coefficient for the resource node, the respective maximum voltage value for the resource node, and the updated value of the respective voltage measurement, an updated value of the second voltage-constraint coefficient for the resource node; determine, based on the updated value of the first voltage-constraint coefficient for the resource node, the updated value of the second voltage-constraint coefficient for the resource node, the respective value of the first voltage-constraint coefficient for each respective node other than the resource node, and the respective value of the second voltage-constraint coefficient for each respective node other than the research node, an updated power setpoint value; and modify the respective output power of the respective inverter-interfaced energy resource based on the updated power setpoint value.

EXAMPLE 13

The system of example 12, wherein: the plurality of inverter-interfaced energy resource management devices are configured to determine the respective power setpoint value based on the respective value of the first voltage-constraint coefficient for each respective node and the respective value of the second voltage-constraint coefficient for each respective node at a first frequency; and the at least one of the plurality of inverter-interfaced energy resource management devices is configured to determine the updated value of the respective voltage measurement that corresponds to the resource node at a second frequency that is smaller than the first frequency.

EXAMPLE 14

The system of example 12, wherein the at least one of the plurality of inverter-interfaced energy resource management devices is configured to determine the updated value of the respective voltage measurement that corresponds to the resource node in response to determining that an updated respective value of the first voltage-constraint coefficient for each respective node and an updated respective value of the second voltage-constraint coefficient for each respective node have not been received within a threshold amount of time.

EXAMPLE 15

The system of example 9, wherein determining the respective power setpoint value is further based on at least one respective performance metric determined by a respective administrator of the respective inverter-interfaced energy resource.

EXAMPLE 16

The system of example 15, wherein the at least one respective performance metric represents at least one of: a cost for ancillary service provisioning or feed-in tariffs.

EXAMPLE 17

The system of example 9, wherein at least one of the plurality of inverter-interfaced energy resource management devices represents one of the plurality of voltage measurement devices.

EXAMPLE 18

A method including: receiving, by a distribution network management system including at least one processor, a plurality of voltage measurements, wherein voltage measurements in the plurality of voltage measurements correspond to respective nodes in a plurality of nodes of a distribution network; determining, by the distribution network management system, for each respective node in the plurality of nodes: a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node; and a respective value of a second voltage-constraint coefficient based on a respective previous value of the second voltage-constraint coefficient, a respective maximum voltage value for the respective node, and the respective voltage measurement; and causing at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

EXAMPLE 19

The method of example 18, wherein causing the at least one inverter-interfaced energy resource to modify the output power includes outputting, to the at least one inverter-interfaced energy resource, the respective value of the first voltage-constraint coefficient for each respective node and the respective value of the second voltage-constraint coefficient for each respective node.

EXAMPLE 20

The method of example 18, wherein causing the at least one inverter-interfaced energy resource to modify the output power includes: determining, for the at least one inverter-interfaced energy resource, a respective power setpoint value, based on the respective value of the first voltage-constraint coefficient for each respective node, the respective value of the second voltage-constraint coefficient for each respective node, and a respective previous power setpoint value; and causing the at least one inverter-interfaced energy resource to modify the output power based on the respective power setpoint.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
at least one processor configured to:
receive a plurality of voltage measurements, wherein voltage measurements in the plurality of voltage measurements correspond to respective nodes in a plurality of nodes of a distribution network;
determine, for each respective node in the plurality of nodes:
a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node; and
a respective value of a second voltage-constraint coefficient based on a respective previous value of the second voltage-constraint coefficient, a respective maximum voltage value for the respective node, and the respective voltage measurement, wherein the respective minimum voltage value for the respective node and the respective maximum voltage value for the respective node represent a defined allowable voltage range at the respective node; and
cause at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

2. The device of claim 1, wherein the at least one processor is configured to cause the at least one inverter-interfaced energy resource to modify the output power by outputting, to the at least one inverter-interfaced energy resource, the respective value of the first voltage-constraint coefficient for each respective node and the respective value of the second voltage-constraint coefficient for each respective node.

3. The device of claim 1, wherein:
the at least one processor is configured to determine the respective value of the first voltage-constraint coefficient by:
determining, based on the respective previous value of the first voltage-constraint coefficient, the respective minimum voltage value for the respective node, and the respective voltage measurement, a respective first coefficient offset value;
scaling the respective first coefficient offset value by a step size to determine a respective scaled first coefficient offset value;
responsive to determining that a respective first sum of the respective previous value of the first voltage-constraint coefficient and the respective scaled first coefficient offset value is greater than zero, setting the respective value of the first voltage-constraint coefficient to be the respective first sum; and responsive to determining that the respective first sum is less than or equal to zero, setting the respective value of the first voltage-constraint coefficient to be zero, and the at least one processor is configured to determine the respective value of the second voltage-constraint coefficient by:

determining, based on the respective previous value of the second voltage-constraint coefficient, the respective maximum voltage value for the respective node, and the respective voltage measurement, a respective second coefficient offset value;

scaling the respective second coefficient offset value by the step size to determine a respective scaled second coefficient offset value;

responsive to determining that a respective second sum of the respective previous value of the second voltage-constraint coefficient and the respective scaled second coefficient offset value is greater than zero, setting the respective value of the second voltage-constraint coefficient to be the respective second sum; and responsive to determining that the respective second sum is less than or equal to zero, setting the respective value of the second voltage-constraint coefficient to be zero.

4. The device of claim 3, wherein:

the at least one processor is configured to determine the respective first coefficient offset value by:

determining a respective first difference value that represents a difference between the respective minimum voltage value and the respective voltage measurement; and determining, as the respective first coefficient offset value, a difference between the respective first difference value and a version of the respective previous value of the first voltage-constraint coefficient that is scaled by a utility-defined parameter, and the at least one processor is configured to determine the respective second coefficient offset value by:

determining a respective second difference value that represents a difference between the respective voltage measurement and the respective maximum voltage value; and determining, as the respective second coefficient offset value, a difference between the respective third difference value and a version of the respective previous value of the second voltage-constraint coefficient that is scaled by the utility-defined parameter.

5. The device of claim 1, wherein:

the at least one processor is configured to determine the respective value of the first voltage-constraint coefficient by calculating $\text{pro}_{\mathbb{R}_+}\{\gamma_n^k + \alpha(V^{min} - \psi_n^k - \epsilon\gamma_n^k)\}$, wherein:

$\gamma_n^k$ represents the respective previous value of the first voltage-constraint coefficient, $V^{min}$ represents the respective minimum voltage value for the respective node, $\psi_n^k$ represents the respective voltage measurement, $\alpha$ represents a step size, and $\epsilon$ represents a predetermined parameter indicating an importance of previous voltage-constraint coefficient values, and the at least one processor is configured to determine the respective value of the second voltage-constraint coefficient by calculating $\text{pro}_{\mathbb{R}_+}\{\mu_n^k \alpha(\psi_n^k - V^{max} - \epsilon\mu_n^k)\}$, wherein:

$\mu_n^k$ represents the respective previous value of the second voltage-constraint coefficient, and $V^{max}$ represents the respective maximum voltage value for the respective node.

6. The device of claim 1, wherein the at least one processor is configured to cause the at least one inverter-interfaced energy resource to modify the output power by:

determining, for the at least one inverter-interfaced energy resource, a respective power setpoint value, based on the respective value of the first voltage-constraint coefficient for each respective node, the respective value of the second voltage-constraint coefficient for each respective node, and a respective previous power setpoint value, and causing the at least one inverter-interfaced energy resource to modify the output power based on the respective power setpoint.

7. The device of claim 6, wherein the device comprises a power distribution network management system.

8. The device of claim 6, wherein the device comprises a respective power inverter communicatively coupled to the at least one inverter-interfaced energy resource.

9. A system comprising:

a plurality of voltage measurement devices, each configured to:

determine a respective voltage measurement that corresponds to a respective node in a plurality of nodes of a distribution network; and output the respective voltage measurement;

a distribution network management system comprising at least one processor that is configured to:

receive, from each of the plurality of voltage measurement devices, the respective voltage measurement;

determine, for each respective node in the plurality of nodes:

a respective value of a first voltage-constraint coefficient, based on a respective previous value of the first voltage-constraint coefficient, a respective minimum voltage value for the respective node, and the respective voltage measurement; and a respective value of a second voltage-constraint coefficient based on a respective previous value of the second voltage-constraint coefficient, a respective maximum voltage value for the respective node, and the respective voltage measurement, wherein the respective minimum voltage value for the respective node and the respective maximum voltage value for the respective node represent a defined allowable voltage range at the respective node; and output the respective value of the first voltage-constraint coefficient for each respective node and the respective value of the second voltage-constraint coefficient for each respective node; and a plurality of inverter-interfaced energy resource management devices corresponding to a plurality of inverter-interfaced energy resources that are connected to the distribution network, each inverter-interfaced energy resource management device comprising at least one processor that is configured to:

receive the respective value of the first voltage-constraint coefficient for each respective node and the respective value of the second voltage-constraint coefficient for each respective node;
  determine, based on the respective value of the first voltage-constraint coefficient for each respective node and the respective value of the second voltage-constraint coefficient for each respective node, a respective power setpoint value; and
  modify a respective output power of a respective inverter-interfaced energy resource from the plurality of inverter-interfaced energy resources, based on the respective power setpoint value.

10. The system of claim 9, wherein at least one of the plurality of inverter-interfaced energy resource management devices comprises a power inverter that couples a respective energy resource to the distribution network.

11. The system of claim 9, wherein at least one of the plurality of inverter-interfaced energy resource management devices comprises a computing device communicatively coupled to a power inverter that couples a respective energy resource to the distribution network.

12. The system of claim 9, wherein:
  the at least one processor of at least one of the plurality of inverter-interfaced energy resource management devices is further configured to:
    determine an updated value of the respective voltage measurement that corresponds to a resource node, the resource node comprising the respective node at which the respective inverter-interfaced energy resource is connected to the distribution network;
    determine, based on the respective value of the first voltage-constraint coefficient for the resource node, the respective minimum voltage value for the resource node, and the updated value of the respective voltage measurement, an updated value of the first voltage-constraint coefficient for the resource node;
    determine, based on the respective value of the second voltage-constraint coefficient for the resource node, the respective maximum voltage value for the resource node, and the updated value of the respective voltage measurement, an updated value of the second voltage-constraint coefficient for the resource node;
    determine, based on the updated value of the first voltage-constraint coefficient for the resource node, the updated value of the second voltage-constraint coefficient for the resource node, the respective value of the first voltage-constraint coefficient for each respective node other than the resource node, and the respective value of the second voltage-constraint coefficient for each respective node other than the research node, an updated power setpoint value; and
    modify the respective output power of the respective inverter-interfaced energy resource based on the updated power setpoint value.

13. The system of claim 12, wherein:
  the at least one processor of the plurality of inverter-interfaced energy resource management devices is configured to determine the respective power setpoint value based on the respective value of the first voltage-constraint coefficient for each respective node and the respective value of the second voltage-constraint coefficient for each respective node at a first frequency; and
  the at least one processor of the at least one of the plurality of inverter-interfaced energy resource management devices is configured to determine the updated value of the respective voltage measurement that corresponds to the resource node at a second frequency that is smaller than the first frequency.

14. The system of claim 12, wherein the at least one processor of the at least one of the plurality of inverter-interfaced energy resource management devices is configured to determine the updated value of the respective voltage measurement that corresponds to the resource node in response to determining that an updated respective value of the first voltage-constraint coefficient for each respective node and an updated respective value of the second voltage-constraint coefficient for each respective node have not been received within a threshold amount of time.

15. The system of claim 9, wherein determining the respective power setpoint value is further based on at least one respective performance metric determined by a respective administrator of the respective inverter-interfaced energy resource.

16. The system of claim 15, wherein the at least one respective performance metric comprises at least one of: a cost for ancillary service provisioning or feed-in tariffs.

17. The system of claim 9, wherein at least one of the plurality of inverter-interfaced energy resource management devices comprises one of the plurality of voltage measurement devices.

18. A method comprising:
  receiving, by a distribution network management system comprising at least one processor, a plurality of voltage measurements, wherein voltage measurements in the plurality of voltage measurements correspond to respective nodes in a plurality of nodes of a distribution network;
  determining, by the distribution network management system, for each respective node in the plurality of nodes:
    a respective value of a first voltage-constraint coefficient, based on a respective previous value of the first voltage-constraint coefficient, a respective minimum voltage value for the respective node, and a respective voltage measurement in the plurality of voltage measurements that corresponds to the respective node; and
    a respective value of a second voltage-constraint coefficient based on a respective previous value of the second voltage-constraint coefficient, a respective maximum voltage value for the respective node, and the respective voltage measurement, wherein the respective minimum voltage value for the respective node and the respective maximum voltage value for the respective node represent a defined allowable voltage range at the respective node; and
  causing at least one inverter-interfaced energy resource in a plurality of inverter-interfaced energy resources that are connected to the distribution network to modify an output power of the at least one inverter-interfaced energy resource based on the respective value of the first voltage-constraint coefficient for each respective node and the respective value of the second voltage-constraint coefficient for each respective node.

19. The method of claim 18, wherein causing the at least one inverter-interfaced energy resource to modify the output power comprises outputting, to the at least one inverter-interfaced energy resource, the respective value of the first voltage-constraint coefficient for each respective node and the respective value of the second voltage-constraint coefficient for each respective node.

20. The method of claim 18, wherein causing the at least one inverter-interfaced energy resource to modify the output power comprises:
- determining, for the at least one inverter-interfaced energy resource, a respective power setpoint value, based on the respective value of the first voltage-constraint coefficient for each respective node, the respective value of the second voltage-constraint coefficient for each respective node, and a respective previous power setpoint value; and
- causing the at least one inverter-interfaced energy resource to modify the output power based on the respective power setpoint.

\* \* \* \* \*

UNITED STATES PATENT AND TRADEMARK OFFICE
CERTIFICATE OF CORRECTION

PATENT NO. : 10,148,092 B2  
APPLICATION NO. : 15/418272  
DATED : December 4, 2018  
INVENTOR(S) : Emiliano Dall'Anese, Andrea Simonetto and Sairaj Dhople Page 1 of 1

It is certified that error appears in the above-identified patent and that said Letters Patent is hereby corrected as shown below:

In the Specification  
Column 1: Insert the following paragraph after Line 23:  
--This invention was made with government support under CCF1442686 awarded by the National Science Foundation. The government has certain rights in the invention.--

Signed and Sealed this  
Twenty-fifth Day of February, 2020

Andrei Iancu  
*Director of the United States Patent and Trademark Office*